(12) United States Patent
Furuya et al.

(10) Patent No.: US 7,848,011 B2
(45) Date of Patent: Dec. 7, 2010

(54) WAVELENGTH CONVERTING ELEMENT

(75) Inventors: Hiroyuki Furuya, Nara (JP); Kiminori Mizuuchi, Osaka (JP); Kazuhisa Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 193 days.

(21) Appl. No.: 11/886,849

(22) PCT Filed: Mar. 24, 2006

(86) PCT No.: PCT/JP2006/305999

§ 371 (c)(1),
(2), (4) Date: Sep. 21, 2007

(87) PCT Pub. No.: WO2006/104051

PCT Pub. Date: Oct. 5, 2006

(65) Prior Publication Data

US 2009/0027764 A1      Jan. 29, 2009

(30) Foreign Application Priority Data

Mar. 25, 2005   (JP)   ............................ 2005-087841

(51) Int. Cl.
  *G02F 2/02*   (2006.01)
(52) U.S. Cl. ........................ 359/328; 359/326; 372/22
(58) Field of Classification Search ......... 359/326–332; 372/21–22
See application file for complete search history.

(56) References Cited

U.S. PATENT DOCUMENTS

| 5,359,452 | A | 10/1994 | Nitanda et al. |
| 6,464,777 | B2 | 10/2002 | Kitamura et al. |
| 6,519,077 | B1 | 2/2003 | Mizuuchi et al. |
| 6,551,528 | B1 | 4/2003 | Sasaki et al. |
| 6,673,330 | B1 | 1/2004 | Kitamura et al. |
| 6,747,787 | B2 | 6/2004 | Furukawa et al. |
| 2001/0001944 | A1 | 5/2001 | Kitamura et al. |
| 2005/0190805 | A1* | 9/2005 | Scripsick et al. ............... 372/41 |
| 2006/0054864 | A1* | 3/2006 | Alekel et al. ........... 252/301.4 R |

FOREIGN PATENT DOCUMENTS

| JP | 5-11225 | 1/1993 |
| JP | 6-16500 | 1/1994 |

(Continued)

OTHER PUBLICATIONS

International Search Report (in English language) issued Apr. 25, 2006 in PCT/JP2006/305999 of which the present application is the U.S. National Stage.

(Continued)

*Primary Examiner*—Hemang Sanghavi
(74) *Attorney, Agent, or Firm*—Wenderoth, Lind & Ponack, L.L.P.

(57) ABSTRACT

A wavelength converting element which does not generate crystal destruction and output saturation of a second harmonic due to a third harmonic generated inside the element is provided. The wavelength converting element receives a fundamental wave which is light having a wavelength (lambda), outputs the second harmonic which is light having a wavelength (lambda/2), and has a crystal including at least one element selected from a group composed of Sc, Y, La, Ce, Pr, Eu, Gd, Ho, Yb, and Lu as an additive.

14 Claims, 13 Drawing Sheets

FOREIGN PATENT DOCUMENTS

| | | |
|---|---|---|
| JP | 7-277896 | 10/1995 |
| JP | 8-278419 | 10/1996 |
| JP | 11-271823 | 10/1999 |
| JP | 2000-221550 | 8/2000 |
| JP | 2001-185795 | 7/2001 |
| JP | 2001-194694 | 7/2001 |
| JP | 2001-287999 | 10/2001 |
| JP | 2002-72266 | 3/2002 |
| JP | 2002-72267 | 3/2002 |
| JP | 2003-161974 | 6/2003 |
| JP | 2003-267798 | 9/2003 |

OTHER PUBLICATIONS

Patent Cooperation Treaty (PCT) International Preliminary Report on Patentability (in Japanese), issued Jun. 14, 2007, in International Application No. PCT/JP2006/305999.

Patent Cooperation Treaty (PCT) International Preliminary Report on Patentability in corresponding International Application No. PCT/JP2006/305999, Issued on Jun. 14, 2007.

* cited by examiner

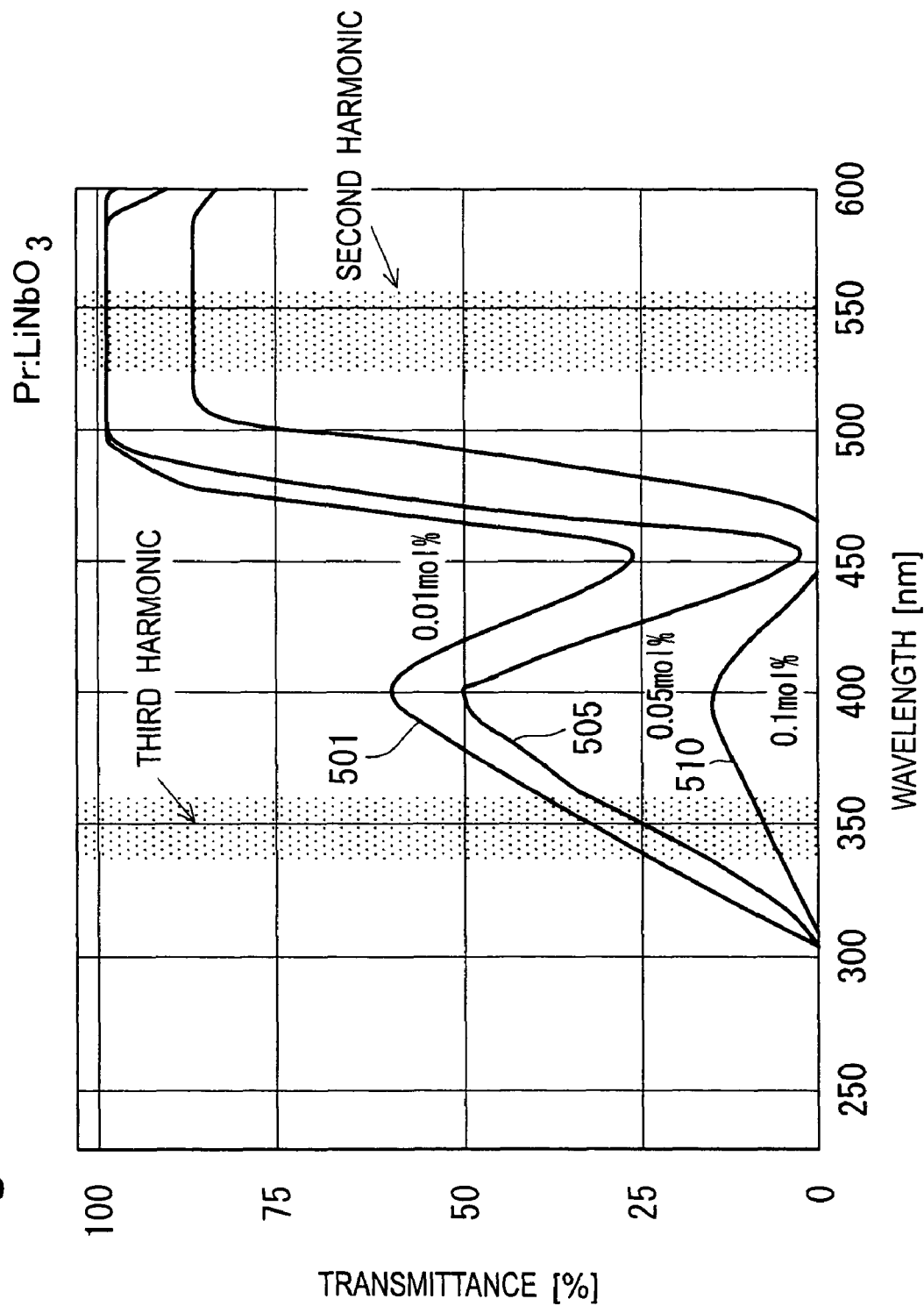

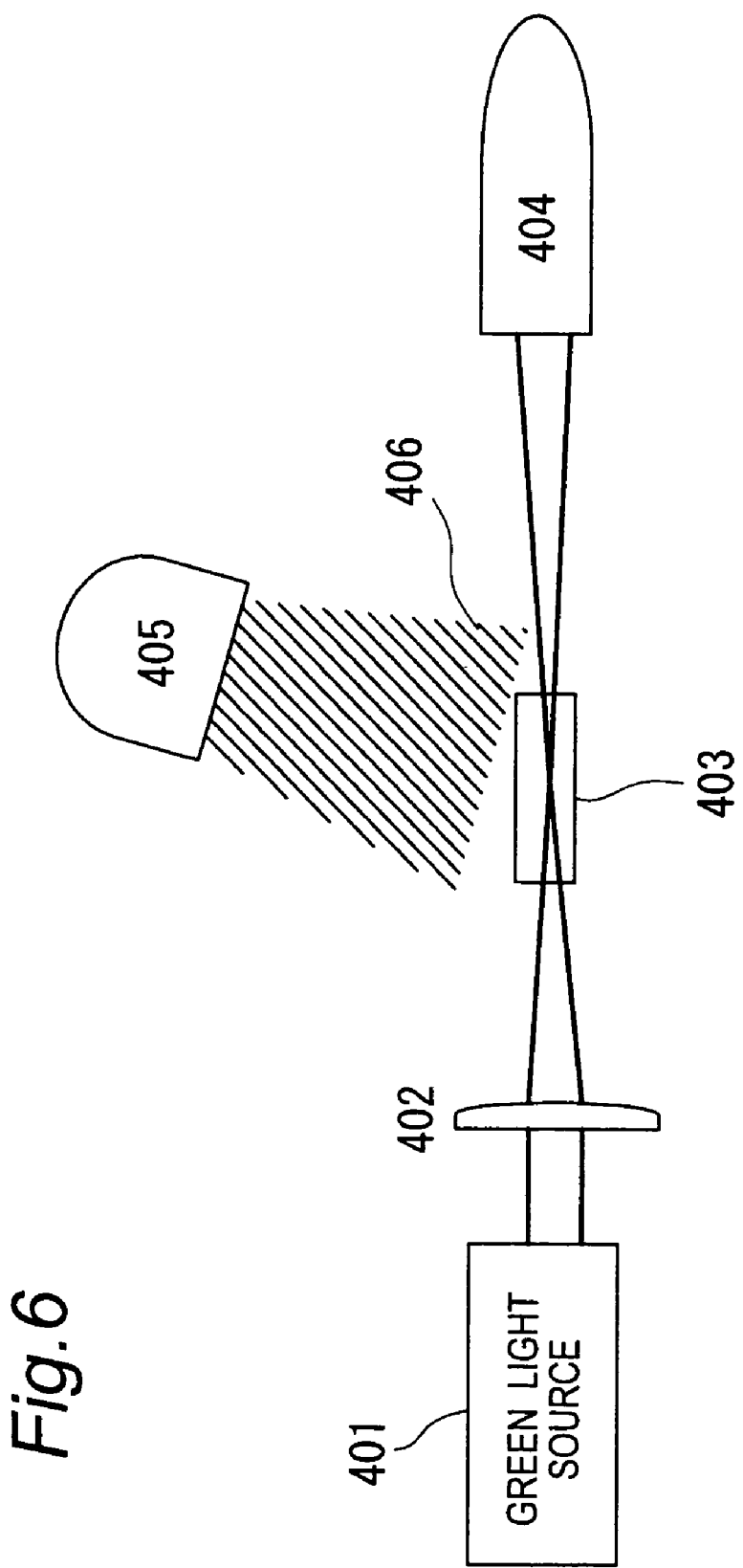

WAVELENGTH CONVERTING ELEMENT

BACKGROUND OF THE INVENTION

1. Technical Field

The present invention relates to a nonlinear optical element. The present invention particularly relates to a wavelength converting element used for light wavelength conversion.

2. Background Art

Recently, attention has been paid to a high output laser light source as a light source used for processing applications, laser displays, or the like. Solid lasers such as a YAG laser, fiber lasers using fibers having rare earth elements such as Yb and Nd, and the like doped thereto have been developed as laser light sources in the infrared light region. On the other hand, in laser light sources of the visible light region, particularly laser light sources of the red and blue light regions, semiconductor lasers using gallium arsenide, gallium nitride, and so forth have been developed and their high output performance has also been studied. However, it is still difficult to directly generate green light from semiconductor lasers. Because of this, a method is generally used that involves: using the above-mentioned solid laser or the fiber laser to firstly obtain an infrared light laser; and then passing the infrared light through a wavelength converting element of a nonlinear optical crystal to carry out wavelength conversion; and thereby obtaining a green light laser.

Prior to the above-mentioned semiconductor laser being developed, there was almost no method of generating laser light of the ultraviolet region from the visible light region except the wavelength conversion which uses a nonlinear optical crystal. Under such technical backgrounds, a variety of nonlinear optical materials such as lithium niobate (LiNbO3), lithium tantalate (LiTaO3), lithium triborate (LiB3O5), beta-barium borate (beta-BaB2O4), potassium titanyl phosphate (KTiOPO4: KTP) and cesium lithium borate (CsLiB6O10: CLBO) have been actively developed and utilized.

Among the plurality of optical materials taken up as examples above, particularly, it is known that the lithium niobate crystal has a large nonlinear optical constant. Because of its large nonlinear optical constant, a nonlinear optical crystal containing a lithium niobate crystal exhibits high conversion efficiency, and further an apparatus using this crystal is capable of being simply constructed. Thus, a quasi phase matching (QPM) wavelength converting element which is formed with employing a polarization inversion technique to a lithium niobate crystal is frequently used in an apparatus having an output of a level of one hundred mW.

For example, the quasi phase matching (QPM) lithium niobate element (QPM-LN element) using a lithium niobate (LN) crystal or lithium tantalate (LT) crystal has a larger nonlinear optical constant than an LBO crystal or a KTP crystal. Accordingly, the wavelength conversion of high efficiency and high output is possible. However, the QPM-LN element requires condensing light energy in a narrow region. As such, substantially, its crystal breakage and deterioration caused by a fundamental wave and its second harmonic that generates from a fundamental wave within a crystal are liable to occur as compared with the crystal breakage and deterioration of the KTP crystal and the like.

In addition, an apparatus having an output of a level of a few W uses a nonlinear optical crystal such as lithium triborate (LBO) and potassium titanyl phosphate (KTP). The former LBO crystal has the advantageous characteristic that crystal breakage and deterioration caused by a fundamental wave and its second harmonic which generates from the fundamental wave within the crystal hardly occurs. However, the nonlinear optical constant of the crystal is small. Because of this, for obtaining high conversion efficiency, a resonator is configured, and the crystal is placed therein. Thus, the configuration of the apparatus becomes complicated and the apparatus also has the disadvantage needing fine adjustment. The nonlinear optical constant of the latter KTP crystal is large as compared with that of the LBO crystal. Hence, the KTP crystal, not like the LBO crystal, can obtain high conversion efficiency without a resonator. However, the KTP crystal has the disadvantage that the crystal breakage and deterioration caused by a fundamental wave and its second harmonic which generates from the fundamental wave within the crystal is liable to occur.

The above-mentioned crystal deterioration includes a refraction index change caused by light (photorefractive). Conventionally, for the restraint of photorefractive, which is one of the crystal deteriorations, impurities which generate absorption peaks within the crystal are removed as much as possible; for the purpose of compensation of holes generated even when that removal is done or of a charge generated by an anti-site defect, which is a presence of different element at the site where originally another element constituting the crystal has existed, the control of shifting the absorption end of transmittance towards the shorter wavelength region by the doping of magnesium oxide or zinc oxide, or the improvement of the transmittance of the visible region is generally performed.

JP 06-016500 A (JP '500) tries the restraint of index change caused by light (photorefractive) by introducing an additive into a crystal (lithium niobate (LN) and lithium tantalate (LT)), and JP 2002-072266 A (JP '266) also tries the restraint by growing a crystal by use of a method of being capable of approaching a crystal composition to an ideal composition (stoichiometry: stoichiometric composition).

However, at present, even those attempts in the above JP '500 and JP '266 have not completely restrained the crystal destruction and deterioration.

As mentioned above, the nonlinear optical crystals each has an advantage and disadvantage. At present where those disadvantages have not been successfully constrained, the advantage and disadvantage of the nonlinear optical crystal are in a relation of trade-off. Because of this, at present, we have to determine the crystal to be used according to the applications while taking into consideration the relation of such trade-off.

Additionally, JP 11-271823 A (JP '823) discloses a wavelength converter having a plurality of wavelength converting elements. FIG. 1 is a schematic block diagram of the wavelength converter described in JP '823. In this wavelength converter, power densities of a fundamental wave being input to each of two wavelength converting elements 102a, 102b are restrained to be low to suppress the deterioration of a wavelength converting element and also the conversion efficiency of the entire wavelength converter is improved. However, a wavelength converter having such as an apparatus configuration includes problems such as a high production cost, complexity of apparatus adjustment, and so forth.

SUMMARY OF THE INVENTION

It is an object of the present invention to provide a wavelength converting element. The present invention provides the wavelength converting element that does not generate the crystal destruction and the output saturation of a second harmonic, which are attributable to ultraviolet light being present in the element, or that at least restrains the crystal destruction and the output saturation of a second harmonic better than the conventional wavelength converting elements.

The present invention is, in a first aspect, a wavelength converting element that receives a fundamental wave of light having a wavelength lambda to output a second harmonic of light having a wavelength lambda/2 and the wavelength converting element has a crystal containing at least one element selected from the group consisting of Sc, Y, La, Ce, Pr, Eu, Gd, Ho, Yb and Lu as an additive.

The present invention is, in a second aspect, a wavelength converting element that receives a fundamental wave of light having a wavelength lambda to output a second harmonic of light having a wavelength lambda/2 and the wavelength converting element has a crystal containing at least one element selected from the group consisting of Sc, Y, La, Ce, Pr, Eu, Gd, Ho, Yb and Lu as an additive.

In the first and second aspects of the present invention, the additive is preferably Ce, Pr or Eu.

Preferably, the additive is Eu.
More preferably, the additive is Ce.
More preferably, the additive is Pr.

Alternatively, in the first and second aspects of the present invention, the additive is preferably Sc, Y, La, Gd, Ho, Yb, or Lu.

Preferably, the additive is Lu.
More preferably, the additive is Ho.
More preferably, the additive is Y.
More preferably, the additive is Yb.
More preferably, the additive is La.
More preferably, the additive is Sc.
More preferably, the additive is Gd.

In the first and second aspects of the present invention, the additive is preferably doped to the crystal as a trivalent oxide.

In the first and second aspects of the present invention, the crystal is preferably a single crystal of lithium niobate.

In the first and second aspects of the present invention, the crystal is preferably a single crystal of lithium tantalate.

In the first and second aspects of the present invention, the single crystal of lithium niobate as being the crystal preferably further has any one of magnesium oxide and zinc oxide as the additive.

In the first and second aspects of the present invention, the single crystal of lithium tantalate as being the crystal preferably further has any one of magnesium oxide and zinc oxide as the additive.

The present invention, in a third aspect, is a laser light source apparatus that includes a laser light source and the wavelength converting element according to the first or second aspect of the present invention, in which a second harmonic of laser light generated by the wavelength converting element that receives laser light emitted by the laser light source is emitted as output laser light, wherein the wavelength of the output laser light is included in the range from 480 to 555 nm, and wherein the output of the output laser light is 1.2 W or more.

In the third aspect of the present invention, the output of the output laser light is preferably 2.5 W or more.

The present inventions is, in a forth aspect, a laser light source apparatus including a laser light source and wavelength converting elements according to the first or second aspect of the present invention, and particularly the wavelength converting element containing as an additive at least any one of Sc, Y, La, Gd, Ho, Yb and Lu, and in the laser light source apparatus, a second harmonic of laser light generated by the wavelength converting element that receives the laser light emitted by the laser light source is emitted as output laser light, wherein the wavelength of the output laser light is included in the range from 400 to 480 nm, and wherein the output of the output laser light is 1.2 W or more.

In the forth aspect of the present invention, the output of the output laser light is preferably 2.0 W or more.

The present invention is, in a fifth aspect, an image display apparatus including a light source and a screen; the light source includes the wavelength converting element of the first or second aspect of the present invention.

A wavelength converting element of the present invention well suppresses the crystal destruction and the output saturation of a second harmonic due to the presence of ultraviolet light in the element while the second harmonic of high-power is output.

BRIEF DESCRIPTION OF THE DRAWINGS

FIG. 5 is a spectral characteristic diagram of the transmittance of a $Pr:LiNbO_3$ single crystal.

FIG. 6 is a schematic diagram for an optical measurement system of an apparatus for evaluating an ultraviolet induction light absorption.

DETAILED DESCRIPTION OF THE INVENTION

Embodiments of the present invention will be set forth below with reference to drawings.

The inventors of the present invention have found that, when an output of a few W of a harmonic using a QPM-LN element is obtained, the infrared light (fundamental wave) being input and the green light (a second harmonic) having generated within the element from the interaction between the infrared lights interact even when, due to its large nonlinear optical constant, the infrared light and the green light deviate from the phase matching condition to generate ultraviolet light (a third harmonic), which is a sum frequency wave of the fundamental wave and the second harmonic, within the QPM-LN element. This discovery has led to the evidence that the output saturation of the second harmonic and the crystal destruction occur due to the presence of ultraviolet light within the element.

Figure 1:
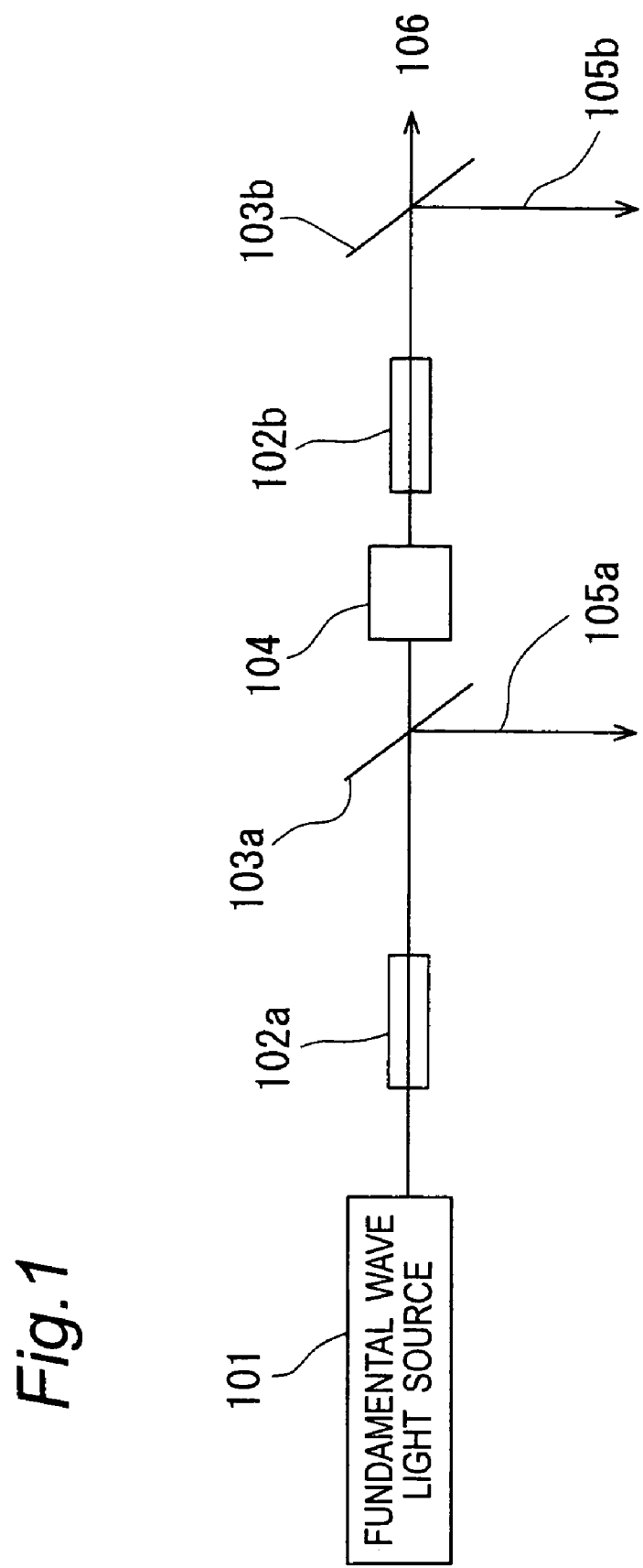
FIG. 1 is a schematic block diagram of a conventional art of a wavelength converter.
Figure 2:
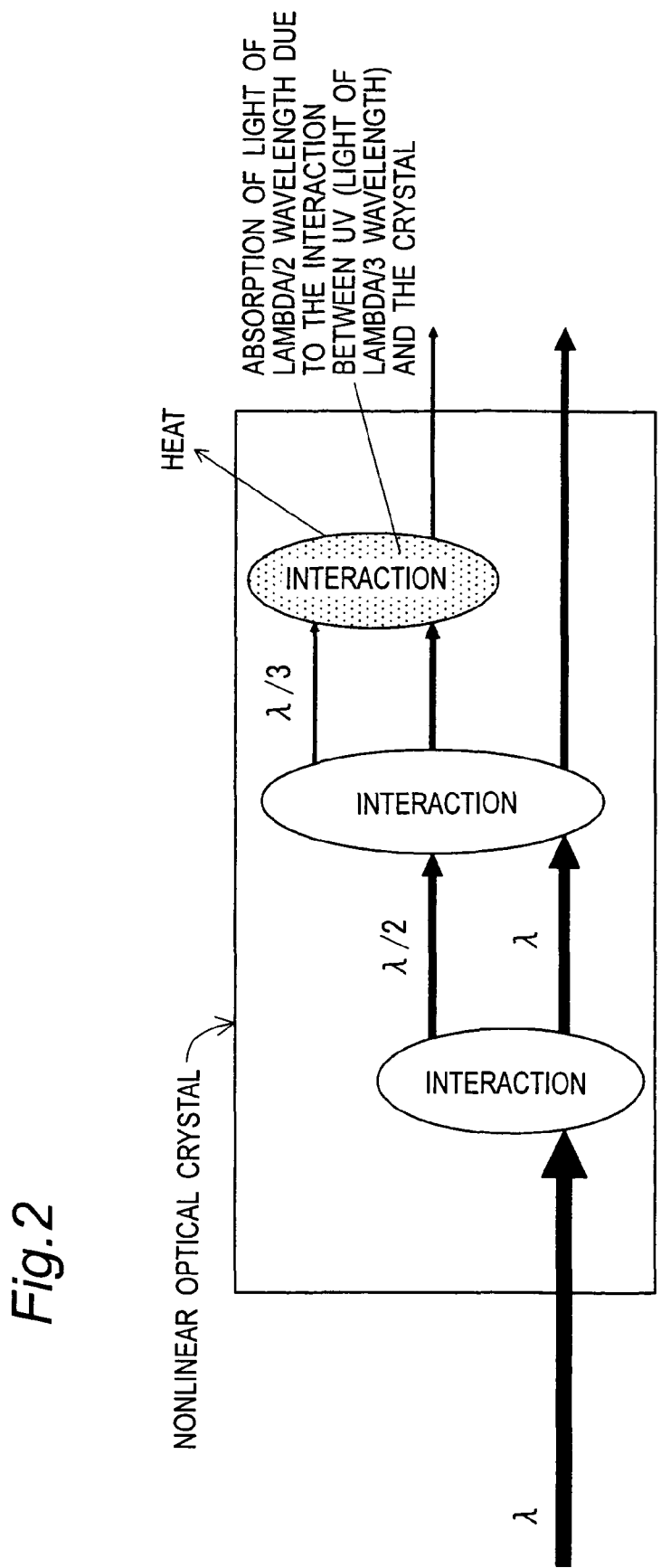
FIG. 2 is a schematic diagram showing the interaction of light in a conventional example of a wavelength converting element.

FIG. 2 is a rough diagram of interaction generated within an element (e.g., QPM-LN element) when the fundamental wave of wavelength lambda is input into the element. The fundamental wave is interacted within the element and a part of the fundamental wave is converted into a second harmonic wave of a wavelength (lambda/2). Further, the fundamental wave and the second harmonic are interacted within the element and a part of them is converted into a third harmonic of a wavelength (lambda/3). When the wavelength of the fundamental wave (lambda) is within a specific range, the third harmonic wavelength (lambda/3) is within a range of ultraviolet light. For example, when lambda is 1110 nm or less, the third harmonic is ultraviolet light of a wavelength of 370 nm or less, and thus the ultraviolet light (wavelength 370 nm or less) propagates within the element. When ultraviolet light of the wavelength of 370 nm or less is present within the element, the ultraviolet light becomes a cause to induce the absorption of green light (second harmonic), the energy absorbed is converted into heat, thereby this absorption causes the output saturation of green light (second harmonic) of the element and the heat causes the crystal destruction.

The crystal destruction attributable to ultraviolet light starts to occur when the power is roughly from 2.5 to 2.8 W or more (the power density of green light in the beam waist region within the element is 50 kW/cm$^2$ to 80 kW/cm$^2$ or more, or the power density of a fundamental wave in the beam waist region within the element is 250 kW/cm$^2$ or more). These thresholds, however, vary depending on elements (and vary depending on the temperature of the element). When light having a wavelength still shorter than that of green light as a second harmonic is generated, the threshold output value of crystal destruction generation further falls down. When blue light is generated as a second harmonic, crystal destruction starts when the blue light output becomes about 2 W or more.

This problem of crystal destruction caused by ultraviolet light has been found, from experiments, to be incapable of being suppressed even when the impurity additive LN or LT crystal as described in JP '500 or LN(SLN) or LT(SLT) of a stoichiometric composition as described in JP '266 is used.

A wavelength converting element according to an embodiment of the present invention solves the problems in a conventional wavelength converting element concerning the crystal destruction and output saturation of a second harmonic due to the ultraviolet light. A wavelength converting element according to an embodiment of the present invention is a wavelength converting element having a nonlinear optical material with at least one species of specific rare earth elements being doped to a crystal.

The nonlinear optical material of the wavelength converting element according to the present invention contains at least one species of specific rare earth elements as an additive. This nonlinear optical material has an absorption peak in a specific spectral band caused by the action of the rare earth ion being doped. When light having a specified wavelength is input as a fundamental wave to the wavelength converting element according to the present invention, the wavelength of the third harmonic generated within a wavelength converting element is within the absorption spectral band of the above rare earth ions, so the third harmonic is absorbed into the rare earth ions.

The absorbed energy of the third harmonic is converted into heat by the excitation-relaxation process of electrons of the rare earth ion, or into light having a wavelength longer than that of the third harmonic. The third harmonic absorption of a rare earth ion suppresses the second harmonic absorption attributable to the immanent third harmonic (ultraviolet light) (which have caused the problems in the conventional wavelength converting element), hence the problem of output saturation during a high output of a second harmonic (e.g., green light) is avoided. In addition, the absorbed energy of the third harmonic is partially converted into heat, and the residual part is converted into light having a wavelength longer than that of the third harmonic. Thus, the amount of heat generated within a wavelength converting element is also suppressed low to thereby avoid the crystal destruction (which have caused a problem in the conventional wavelength converting element).

Figure 3:
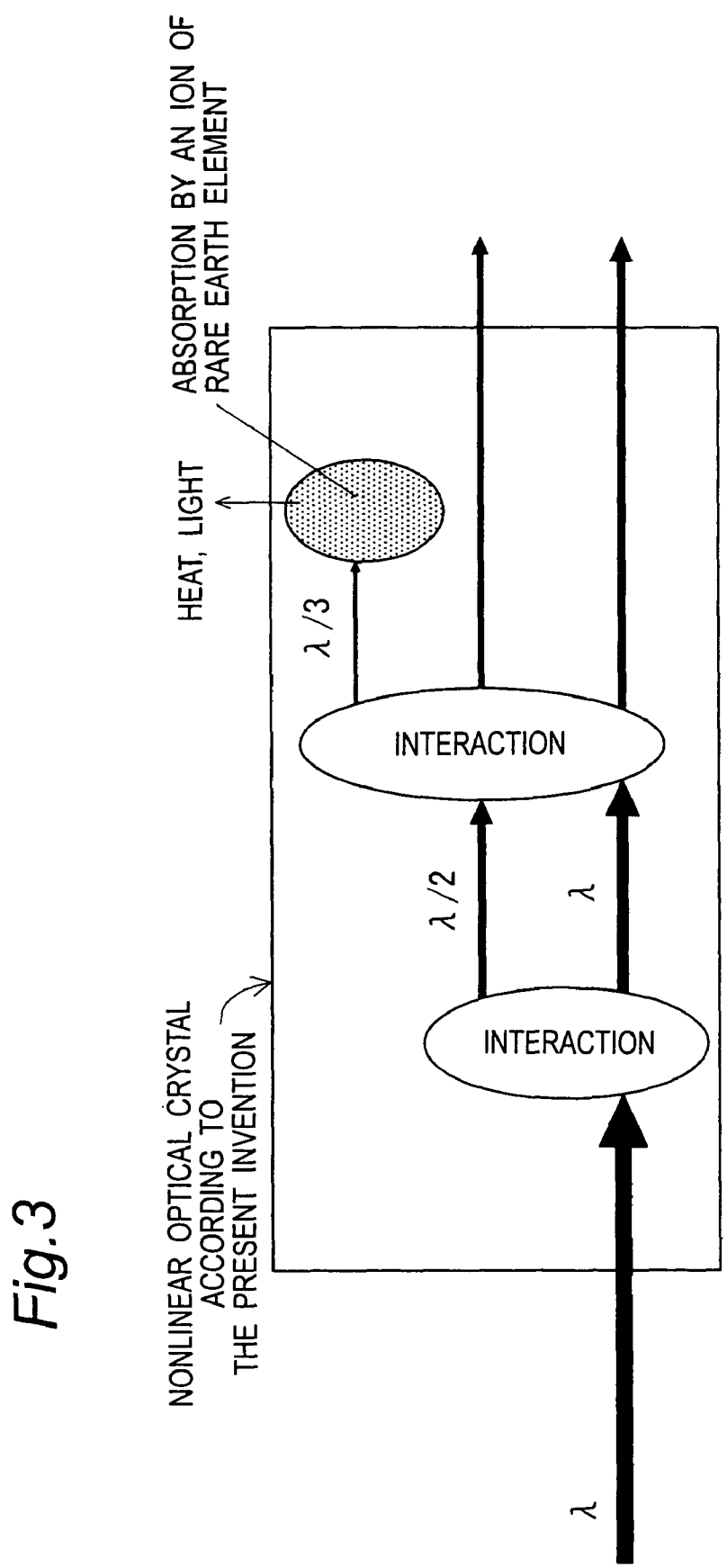
FIG. 3 is a schematic diagram showing the interaction of light in a wavelength converting element according to the present invention.

FIG. 3 is a rough diagram of the interaction that occurs within the element when a fundamental wave of a specific wavelength (lambda) is input into a wavelength converting element according to an embodiment of the present invention. A fundamental wave (lambda) is interacted within the element and partially converted into a second harmonic (wavelength lambda/2). Furthermore, the fundamental wave (lambda) and the second harmonic (lambda/2) are interacted within the element and partially converted into a third harmonic (wavelength lambda/3). When the lambda is within a specified range, the third harmonic (lambda/3) is light in the ultraviolet region. At this time, the wavelength (lambda/3) of the third harmonic is contained in the absorption spectral band of the doped rare earth ion. Hence, the ultraviolet light (the third harmonic (lambda/3)) is absorbed in the doped rare earth ion and converted into heat or light having a wavelength longer than that of the third harmonic. Because of this, the interaction between the second harmonic and the third harmonic is rarely generated, and the output saturation of a second harmonic and crystal destruction attributable to the immanent ultraviolet light are well suppressed.

Embodiment 1

A wavelength converting element according to a first embodiment of the present invention is a wavelength converting element having a nonlinear optical material produced by doping of praseodymium (Pr), which is one of the rare earth elements, to a crystal.

<Crystal Growth Method>

First, a method of growing a crystal of lithium niobate (Pr:LN) having praseodymium ion (Pr$^{3+}$) doped thereto will be set forth.

Normally, lithium niobate is produced by use of Czochralski method, which is one of a method for growing a crystal. Hereinafter, a method of manufacturing lithium niobate (Pr: LN) having Pr$^{3+}$ doped therein with reference to FIG. 4 will be set forth.

First, niobium oxide ($Nb_2O_5$), praseodymium oxide ($Pr_2O_3$) and lithium carbonate ($Li_2CO_3$) of a purity of 4N are weighed and the resulting material is calcined at 1100 degrees Celsius for 10 hours. In this case, the amount of doping of praseodymium oxide is set to be 0.05 mol % based on the molar ratio of $Pr_2O_3/(LiNbO_3+Pr_2O_3)$. The raw material produced in this manner is placed in a platinum crucible 205 having a diameter of 100 mm and a height of 100 mm and melted by high frequency induction heating by means of a heating apparatus (not shown). Operation of melting the raw material is continually repeated while supplying the raw material until the crucible 205 is filled with a raw material melt 203 and then the surface temperature of the melt 203 is set to become 1260 degrees Celsius and a seed crystal 202 of lithium niobate is introduced. In the embodiment, the pulling direction is set to the z direction (c axis of the crystal axis directions), which is the dielectric axis of the crystal, and in about 2 days a single crystal 204 of Pr:LiNbO₃ of about 30 mm is obtained. At this time, the rotation speed of the seed crystal 202 is 20 rpm and the pulling rate is 2 mm/h.

For the molar ratio of the amount of doping of praseodymium oxide, the upper limit is desirably about 0.5 mol %. If the ratio is 0.5 mol % or less, an arbitrary selection of doping amount makes the growth of the crystal easy. The molar ratio of the doping amount is preferably from 0.01 to 0.1 mol %, more preferably from 0.01 to 0.05 mol %.

Figure 4A:
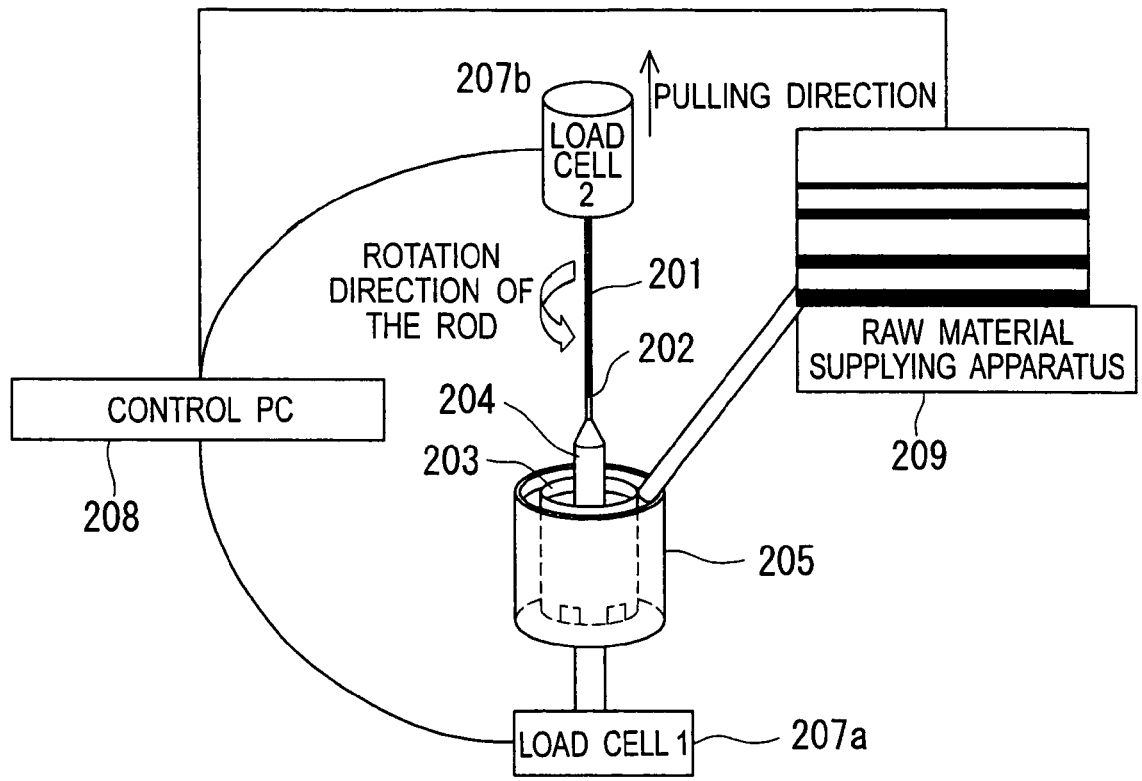
FIGS. 4A and 4B are, respectively, a schematic diagram of a single crystal growing apparatus used in first and second embodiments and a schematic diagram of a crucible for single crystal growth.
Figure 4B:
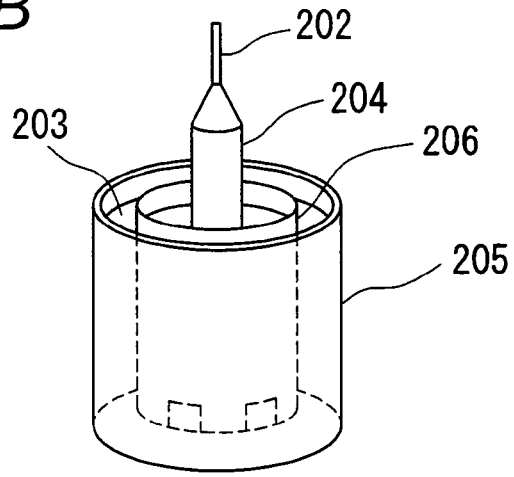

As shown in FIG. 4A, in the present embodiment, a crystal growth furnace that can continuously introduce a raw material is used as an apparatus for growing a crystal. With reference to FIG. 4A, its mechanism will be described. The raw material of a crystal is filled in the platinum crucible 205. The seed crystal 202 fixed on a pulling rod 201 is made contact with the melt 203 and gradually pulled to grow a single crystal 204. In the platinum crucible 205 (its enlarged diagram is shown in FIG. 4B) a platinum guide 206 is placed such that they make up a double structural crucible. In the lower part of the guide 206 has a gap, and, from the gap, a melt can be moved back and forth. The crucible 203 can be weighed by means of load cells 1 and 2 (weight monitors) 207a and 207b during the growth of a crystal. A control PC 208 connected to the load cells 1 and 2 (207a and 207b) controls the supply of a raw material from a raw material supplier so that a weight reduction due to crystallization may be compensated by the supply from the raw material supplier. This prevents segregation, which represents an existence of variation in the composition of an additive in the upper and lower parts along the crystal pulling direction.

The upper part (shoulder) and lower part (tail) of the grown crystal are cut and single-domain treatment is carried out; the resulting material is cut in a direction perpendicular to the Z axis and the surface is end ground to obtain a lithium niobate (Pr:LiNbO3)) wafer (z plate) having Pr:LN (praseodymium ion ($Pr^{3+}$)) doped therein.

<Transmitted Spectral Measurement Results>

A transmission spectrum of the Pr:LN wafer thus obtained was measured by a spectrophotometer. FIG. 5 is a diagram of spectral characteristics of transmittances of the Pr:LN wafer. In the plot, the abscissa axis designates the wavelength [nm] and the ordinate axis designates transmittance [%]. The measurement target Pr:LN wafers were three Pr:LN wafers of 0.01 mol %, 0.05 mol % and 0.1 mol % based on the molar ratio of the amount of doping of praseodymium oxide. Hereafter, Pr:LN of the molar ratio x mol % of the amount of doping of praseodymium oxide is designated as x mol % Pr:LN. The figure plots a 0.01 mol % Pr:LN transmittance curve 501, 0.05 mol % Pr:LN transmittance curve 505 and 0.1 mol % Pr:LN transmittance curve 510. Additionally, in the drawing, spectral bands of the second harmonic (lambda/2) (green light) and the third harmonic (lambda/3) (ultraviolet light) in the case where infrared light is set to be a fundamental wave (lambda) are shaded to aid the understanding.

When referring to the plot, the three transmittance curves 501, 505 and 510 exhibit in common substantially flat and high transmittance characteristics near the wavelength 542 nm in the green light region and also exhibit relatively low transmittance characteristics in the vicinity of the wavelength 361 nm in the ultraviolet region as compared with that of wavelength of near 542 nm. In other words, three Pr:LN wafers for measurement targets transmit light of wavelengths near 542 nm well in common and absorb light of wavelengths near 361 nm well in common. Therefore, if the infrared light of the wavelength (lambda:lambda≈1084 nm) is set to be a fundamental wave, the three Pr:LN wafers transmit green light near the second harmonic (lambda/2: lambda/2≈542 nm) well in common, and absorb ultraviolet light near the third harmonic (lambda/3: lambda/3≈361 nm) well in common.

Conventionally, it is regarded that, the shorter the absorption end of a nonlinear optical crystal is, the more suitable the nonlinear optical crystal for wavelength conversion use is. Hence, a method which excludes an element which causes absorption as much as possible is common. Additionally, no attention has been paid at all to the fact that, like lithium niobate, material having a large nonlinear optical constant generates an unexpected harmonic (e.g., a third harmonic) and induces the absorption of a necessary harmonic (e.g., second harmonic). To the contrary, a nonlinear optical material constituting a wavelength converting element according to the present invention has an absorption line near a third harmonic and absorbs and removes an unnecessary third harmonic to restrain the absorption of green light (e.g., second harmonic) induced by ultraviolet light (e.g., third harmonic). A method of rendering a crystal to absorb a third harmonic, like the present invention, is most desirable to suppress a phenomenon in which the occurrence of a third harmonic induces the absorption of a second harmonic. A nonlinear optical crystal according to the embodiment converts the absorbed energy of a third harmonic into heat and light. Specifically, praseodymium (Pr) converts the energy of a third harmonic into heat and light of a wavelength of from 515 to 555 nm. Hence, an increase in heat in the crystal along with an increase of a second harmonic output is well suppressed. Additionally, for example, europium (Eu), another rare earth element, converts the energy of a third harmonic into heat and light having a wavelength of from 610 nm to 660 nm. As such, the change of a rare earth element to be doped also makes it possible to control a wavelength of light converted and output.

<Results of Green Light Absorptance Measurement>

Next, the absorption of green light attributable to ultraviolet light present within a nonlinear optical material was measured for evaluation (hereinafter, the measurement is called a "mercury lamp irradiation test").

FIG. 6 is a schematic diagram of an optical measurement system used in the mercury lamp irradiation test. This optical measurement system has: a green light source 401 used as a light source; a lens 402; a mercury lamp 405; and a power meter 404 for measuring the power of transmission light. The green light source 401 includes a YAG laser and an element which generates a second harmonic (wavelength 532 nm, 25 mW) from the laser light emitted by the YAG laser to emit light of a wavelength of 532 nm (532 nm light). The lens 402 is a lens having a focal length of 25 mm and is disposed at the position where the light comes into a focus in a crystal sample 403. The crystal sample 403 as a measurement target is a measurement target crystal being cut and polished into a size in which the substrate thickness is 1 mm and the beam path is 25 mm. The mercury lamp 405 can irradiate the crystal sample 403 with an ultraviolet light 406 from above the crystal sample 403. The amount of transmission of the 532 nm light through the crystal sample 403 during radiation of the ultraviolet light 406 and also during no radiation of the ultraviolet light 406 is determined from the measurement of the power of transmitted 532 nm light by means of the power meter 404.

Figure 7:
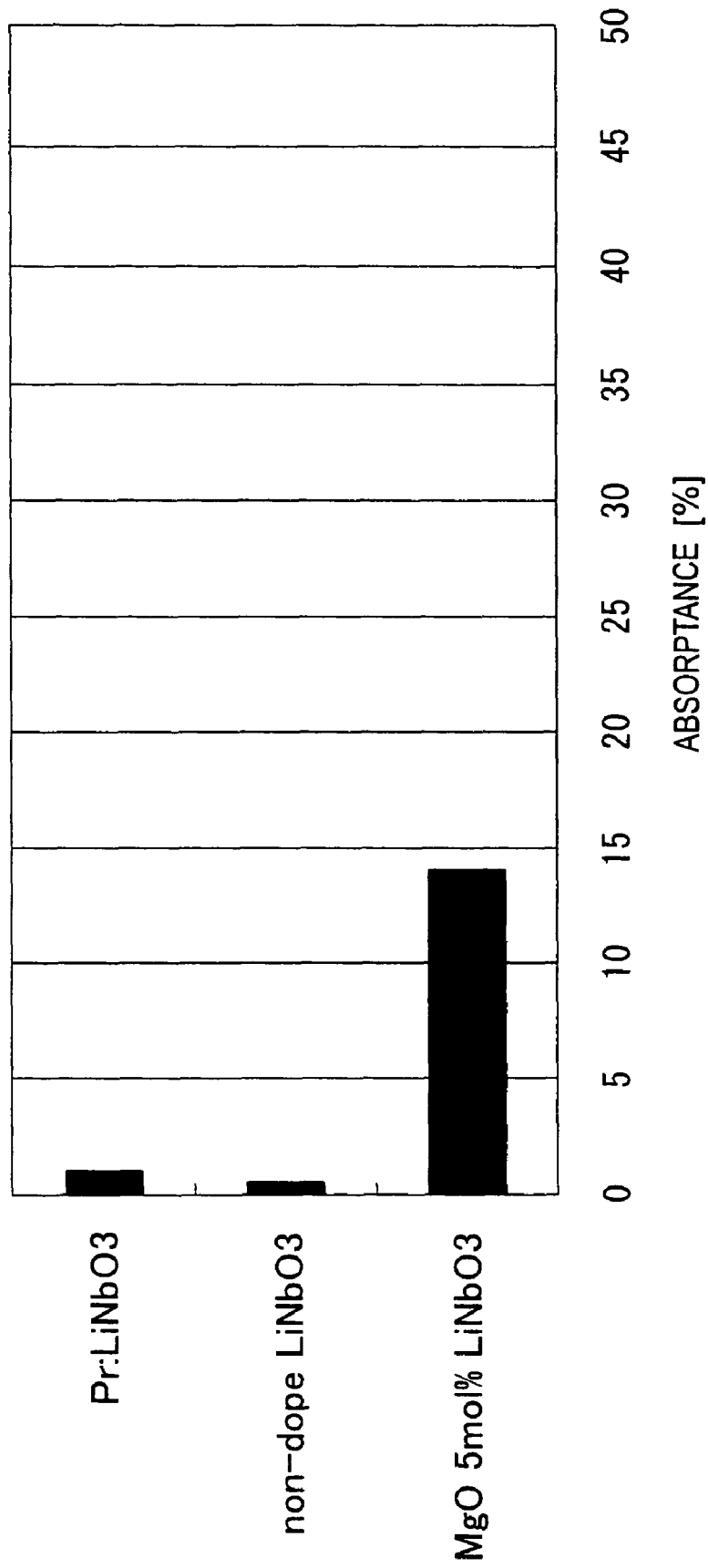
FIG. 7 is a diagram showing light absorption evaluation results of $Pr:LiNbO_3$ by means of the apparatus for evaluating an ultraviolet induction light absorption.

The ratio of the difference between the transmitted 532 nm light power during no radiation of ultraviolet light and the transmitted 532 nm light power during radiation of ultraviolet light to the transmitted 532 nm light power during the no radiation of ultraviolet light is defined as absorptance. FIG. 7 is a diagram indicating the result of the mercury lamp irradiation tests (green light absorptance measurement). In the diagram, the abscissa axis denotes the percentage of the absorptances and the three crystal samples 403 are placed on the ordinate for indicating the measurement results. The three crystal samples 403 are Pr:LiNbO$_3$ grown in the embodiment, non-doped LiNbO$_3$ as a reference and MgO:LiNbO$_3$ having 5 mol % of MgO doped therein.

In conventionally well used MgO:LiNbO$_3$ having MgO doped therein for the purpose of light damage suppression, the transmittance when ultraviolet light is irradiated is shown to lower by 15% as compared with the transmittance when ultraviolet light is not irradiated. On the other hand, the transmittances for the non-doped LiNbO$_3$ and Pr:LiNbO$_3$ grown in the embodiment do not lower. In other words, the doping of Pr is shown to well restrain green light absorption induced by ultraviolet light. Additionally, in the non-doped LiNbO$_3$, the refractive index change (deterioration) caused by light as mentioned above is liable to occur. It is to be noted that the non-doped LiNbO$_3$ is unsuitable for a wavelength converting element.

<Wavelength Converting Element Using Pr:LiNbO$_3$>

Next, a wavelength converting element using Pr:LiNbO$_3$ will be set forth.

<Formation of a Wavelength Converting Element>

The Pr:LiNbO$_3$ wafer obtained by growth is subjected to photo-processing to form an electrode, and an electric field is applied thereto to carry out a polarization inversion treatment. First, a metal film as an electrode material is vapor-deposited onto a substrate (1 mm thickness in the present embodiment), of which both-side are polished optically so as to form an electrode. The z axis direction of the substrate, which is a crystal dielectric principal axis, is perpendicular to the substrate surface (z plate). Subsequently, a photoresist is applied thereto and an electrode pattern is patterned using a contact exposure method. Then, a metal electrode is formed by a dry etching apparatus. Thereafter, a dielectric is formed on the metal film and a pulse train of the direct current (number of times: 5000, pulse width: 0.5 msec) is applied to the electrode to form a polarization inversion structure in the crystal. At that time, the inversion period is set to Lambda=7.36 micro-m. The Lambda of 7.36 micro-m is the period in which a second harmonic of the 1084 nm light is generated. And the length of the wavelength converting element is set to 25 mm.

<Characteristic Evaluation of the Wavelength Converting Element of Pr:LiNbO$_3$ Crystal>

Figure 8:
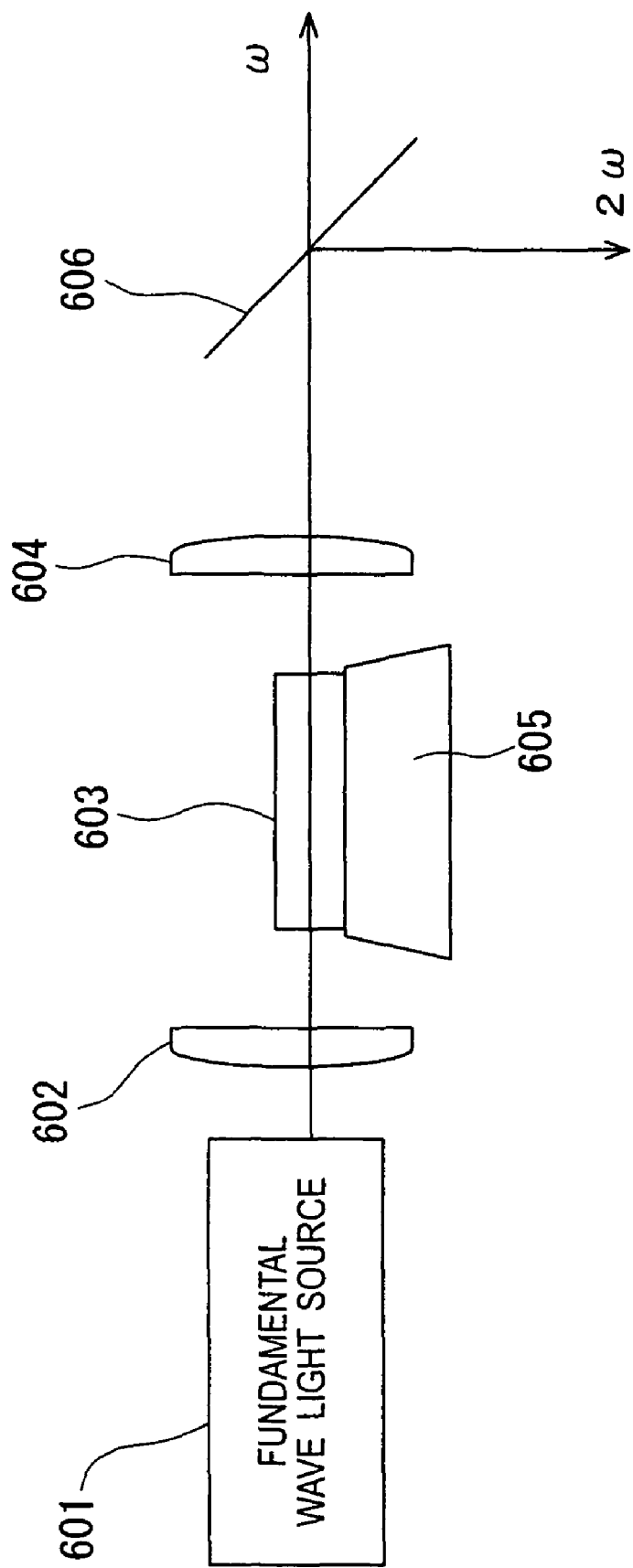
FIG. 8 is a diagram of an optical measurement system for the apparatus for evaluating wavelength conversion characteristics.

A wavelength conversion characteristic evaluation is carried out on an element formed in above mentioned manner. Herein, the wavelength conversion characteristic evaluation is carried out by measuring the power of a second harmonic being output while changing the power of a fundamental wave being input. FIG. 8 is a schematic diagram of an optical system used in the wavelength conversion characteristic evaluation. The optical system includes: a fundamental wave light source 601; a condenser lens 602; a re-collimate lens 604; and a wavelength separation filter 606, and further includes a Peltier element 605 that controls the temperature of a polarization inversion element 603 of being a wavelength converting element. The fundamental wave light source 601 includes an Yb doped fiber laser of an oscillating wavelength of 1084 nm and can emit infrared light (parallel light: beam diameter 760 micro-m). The condenser lens 602 indicates f=30 mm and condenses infrared parallel light from the fundamental wave light source 601 into the polarization inversion element 603 which is fixed by the Peltier element. The re-collimate lens 604 re-collimates light emitted from the polarization inversion element 603 to send the light to the wavelength separation filter 606. The wavelength separation filter 606 separates the light emitted from the polarization inversion element 603 into a fundamental wave (omega) and a second harmonic (2omega), and a power meter (not shown) determines the power of the second harmonic. Additionally, the Peltier element 605 controls the temperature of the polarization inversion element 603 to about 25 degrees Celsius during characteristic evaluation).

Figure 9:
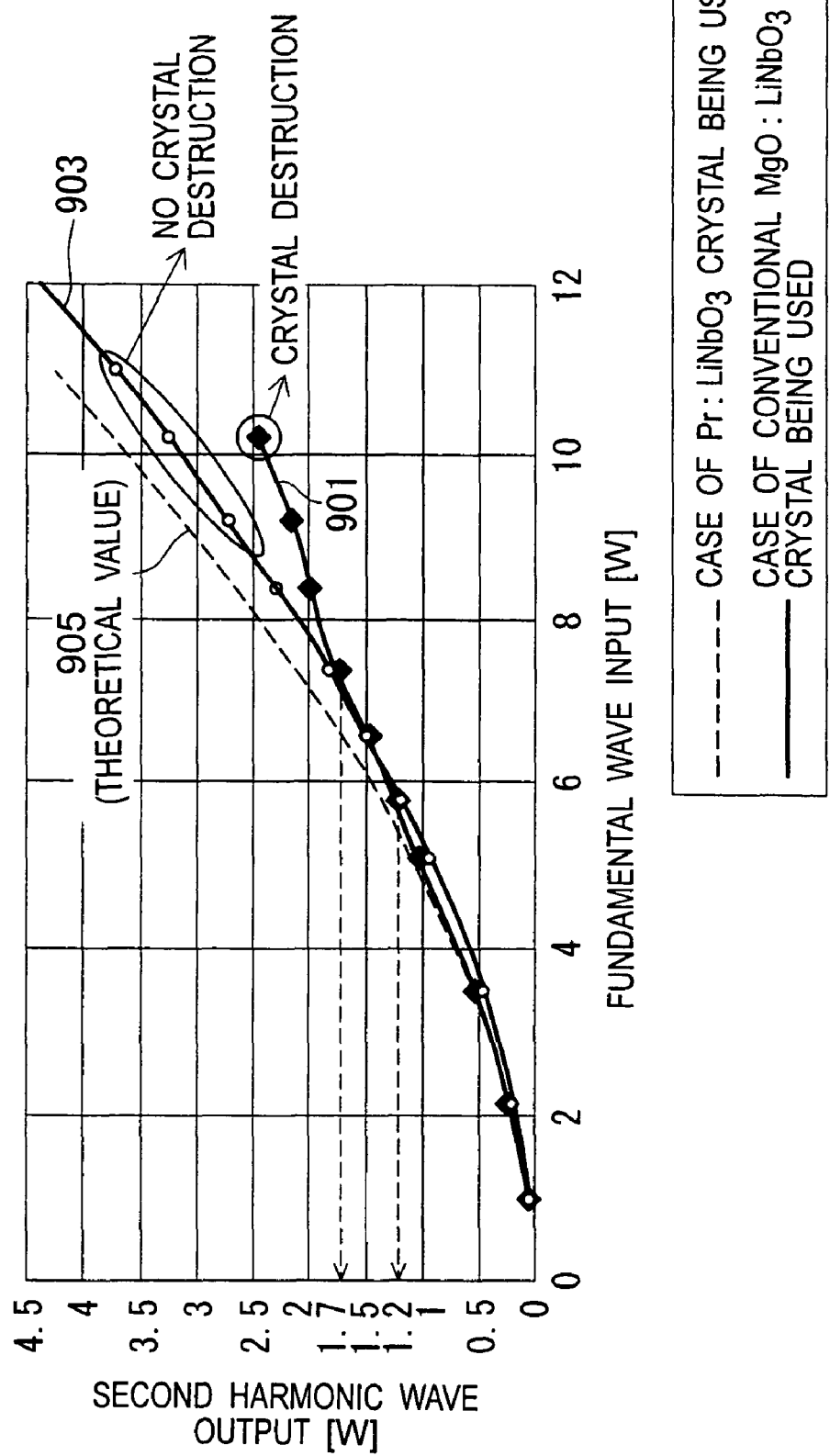
FIG. 9 is a diagram of wavelength conversion characteristic evaluation results of polarization inversion wavelength converting elements having $Pr:LiNbO_3$.

FIG. 9 is a graph plotting the results of the present characteristic evaluation. In this plot, the abscissa axis denotes the power [W] of the fundamental wave being input to the polarization inversion element 603, and the ordinate axis is the power [W] of the second harmonic wave (second harmonic (2omega)) measured by the power meter. In the present characteristic evaluation, two types of wavelength converting element are used. That is, the wavelength converting element of MgO:LiNbO$_3$ conventionally having 5 mol % of MgO doped therein and the wavelength converting element of Pr:LiNbO$_3$ being grown in the present embodiment and having the polarization inversion structure are used as the polarization inversion element 603.

First, looking at a characteristic curve 901, which indicates the characteristic of the polarization inversion element (wavelength converting element) of the conventional crystal material MgO:LiNbO$_3$ with the polarization inversion structure formed therein, the curve 901 clearly bends at the vicinity where the second harmonic output exceeds 1.2 W, and the slope of the curve 901 in the range until the output 1.7 W therefrom gets smaller as compared with the slope in a lower output range (1.2 W or less). This is attributable to the occurrence of the second harmonic (green light) absorption due to the third harmonic (ultraviolet light), which is generated by the interaction of the fundamental wave and the second harmonic. Further, the curve 901 clearly bends again at the vicinity where the second harmonic output exceeds 1.7 W, and in the region of 1.7 W output or more (the region where the input exceeds about 8 W), the slope of the curve 901 gets smaller as compared with the region of from 1.2 W to 1.7 W outputs. This indicates the occurrence of the second harmonic output saturation. Finally, when the output of the second harmonic (green light) reached about 2.5 W, internal damage within a crystal (crystal destruction) was occurred, hence the output of 2.5 W or more could not be obtained.

On the other hand, looking at a characteristic curve 903, which indicates the characteristic of the polarization inversion element (wavelength converting element) of the Pr:LiNbO$_3$ of the present embodiment with the polarization inversion structure formed therein, it shows a slight but enlarging decrease in conversion efficiency in comparison with a characteristic curve 905 of the theoretical value, as the second harmonic output rises. However, the occurrence of the second harmonic (green light) absorption due to the third harmonic (ultraviolet light) (e.g., the vicinity of the 1.2 W output of the curve 901) and the occurrence of output saturation of the second harmonic (e.g., the vicinity of the 1.7 W output of the curve 901) were well suppressed, so that no crystal destruction was observed even when the second harmonic output exceeds 2.5 W, and a second harmonic output exceeding 4 W could be obtained. This is due to the effect of ultraviolet absorption caused by the doped praseodymium (Pr). It is to be noted that the theoretical curve 905 is a parabolic curve of the second order polynomial obtained from an order evaluation of the theoretical equation.

In the case where infrared light is input as a fundamental wave so as to output green light as a second harmonic, the wavelength converting element of the present embodiment having a polarization inversion element in which a polarization inversion structure is formed in the $Pr:LiNbO_3$ crystal is advantageous when a second harmonic (green light) output of 1.2 W or more is obtained, and more advantageous when a second harmonic output of 1.7 W or more is obtained. Herein, the second harmonic may be, for example, green light of a wavelength from 480 to 560 nm and, in this case, the fundamental wave may be infrared light of a wavelength from 960 to 1120 nm. Still moreover, the second harmonic is desirably green light having a wavelength from 480 to 555 nm. In this case, the fundamental wave may be infrared light having a wavelength from 960 to 1110 nm.

In addition, the nonlinear optical material used for the wavelength converting element according to the present embodiment can include, as an additive in the crystal, cerium (Ce) and europium (Eu) as well as praseodymium (Pr). Pr, Ce and Eu can in common absorb ultraviolet light and convert the energy of the absorbed ultraviolet light into heat and light. Pr can convert the energy of ultraviolet light into heat and light having a wavelength from 515 to 555 nm. Ce can convert the energy of ultraviolet light into heat and light having a wavelength from 430 to 470 nm. Eu can also convert the energy of ultraviolet light into heat and light having a wavelength from 610 to 660 nm.

Preferably, the nonlinear optical material used for the wavelength converting element according to the present embodiment includes, as an additive in the crystal, at least any one of praseodymium (Pr), cerium (Ce) and europium (Eu).

More preferably, the nonlinear optical material used for the wavelength converting element according to the present embodiment includes, as an additive in the crystal, at least any one of praseodymium (Pr) and cerium (Ce). This is because Pr and Ce do not have the small absorption peak in the green light region (wavelength of from 500 nm to 550 nm) that is present in Eu. Because of this, the wavelength converting element including any one or more of Pr and Ce attains high efficient wavelength conversion.

Further more preferably, the nonlinear optical material used for the wavelength converting element according to the present embodiment includes, as an additive in the crystal, praseodymium (Pr). This is because the capability of absorbing ultraviolet light of Pr is superior to the ultraviolet light absorption capability of Ce. Pr has excellent in transparency in the green light region and in ultraviolet light absorption capability, and, hence, is most desirable as the additive.

Among the improvements of the absorption capabilities for the light in the ultraviolet region by adding the above three rare earth elements as dopants, the improvement when Pr is doped is the largest, the improvement when Ce is doped is secondly largest, and the improvement when Eu is doped is thirdly largest. The above three rare earth elements are all suitable for the wavelength converting element according to the present embodiment; the higher the absorption capability of light in the ultraviolet region is, the more advantageous the wavelength converting element is.

For the above mentioned three additives from rare earth elements, the upper limits of the molar ratio of the amount of doping of their oxides is preferably about 0.5 mol % in common, as in the case of the example of praseodymium oxide mentioned above. When the molar ratio does not exceed 0.5 mol %, an arbitrary amount of doping can be selected and easily grow the crystal. The molar ratio of the amount of doping is more preferably from 0.01 to 0.1 mol %, further more preferably from 0.01 to 0.05 mol %.

Embodiment 2

A wavelength converting element according to a first embodiment of the present invention is a wavelength converting element having a nonlinear optical material produced by doping of gadolinium (Gd), which is one of the rare earth elements, to a crystal.

<Crystal Growth Method>

First, a method of growing a crystal of lithium niobate (Gd:LN) having gadolinium ion (Gd3+) doped thereto will be set forth.

A method of growing the crystal of lithium niobate (Gd:LN) having gadolinium ion (Gd3+) doped thereto is similar to the method of growing the crystal described in the first embodiment.

First, niobium oxide, gadolinium oxide ($Gd_2O_3$) and lithium carbonate of a purity of 4N are weighed and the resulting material is calcined at 1100 degrees Celsius for 10 hours. In this case, the amount of doping of gadolinium oxide is set to be 0.05 mol % based on the molar ratio of $Gd_2O_3/(LiNbO_3+Gd_2O_3)$. The raw material produced in this manner is placed in a platinum crucible 205 (see FIGS. 4A and 4B) having a diameter of 100 mm and a height of 100 mm and melted by high frequency induction heating by means of a heating apparatus (not shown). Operation of melting the raw material is continually repeated while supplying the raw material until the crucible 205 is filled with a raw material melt 203 (see FIGS. 4A and 4B) and then the surface temperature of the melt 203 is set to become 1260 degrees Celsius and a seed crystal 202 of lithium niobate is introduced. In the embodiment, the pulling direction is set to the z direction (c axis in a crystal axis direction), which is the dielectric axis of the crystal, and in about 2 days a single crystal 204 of $Gd:LiNbO_3$ of about 30 mm is obtained. At this time, the rotation speed of the seed crystal 202 is 20 rpm and the pulling rate is 2 mm/h.

For the molar ratio of the amount of doping of gadolinium oxide, the upper limit is desirably about 0.5 mol %. If the ratio is 0.5 mol % or less, an arbitrary selection of doping amount makes the growth of the crystal easy. The molar ratio of the doping amount is preferably from 0.05 to 0.5 mol %, more preferably from 0.05 to 0.1 mol %.

As in the first embodiment, in the present embodiment, a crystal growth furnace with a double structural crucible that can continuously introduce a raw material is used as an apparatus for growing a crystal. This mechanism prevents segregation, which represents an existence of variation in the composition of an additive in the upper and lower parts along the crystal pulling direction.

The upper part (shoulder) and lower part (tail) of the grown crystal are cut and single-domain treatment is carried out; the resulting material is cut in a direction perpendicular to the Z axis and the surface is end ground to obtain a lithium niobate ($Gd:LiNbO_3$)) wafer (z plate) having Gd:LN (gadolinium ion ($Gd^{3+}$)) doped therein.

<Transmitted Spectral Measurement Results>

Figure 10:
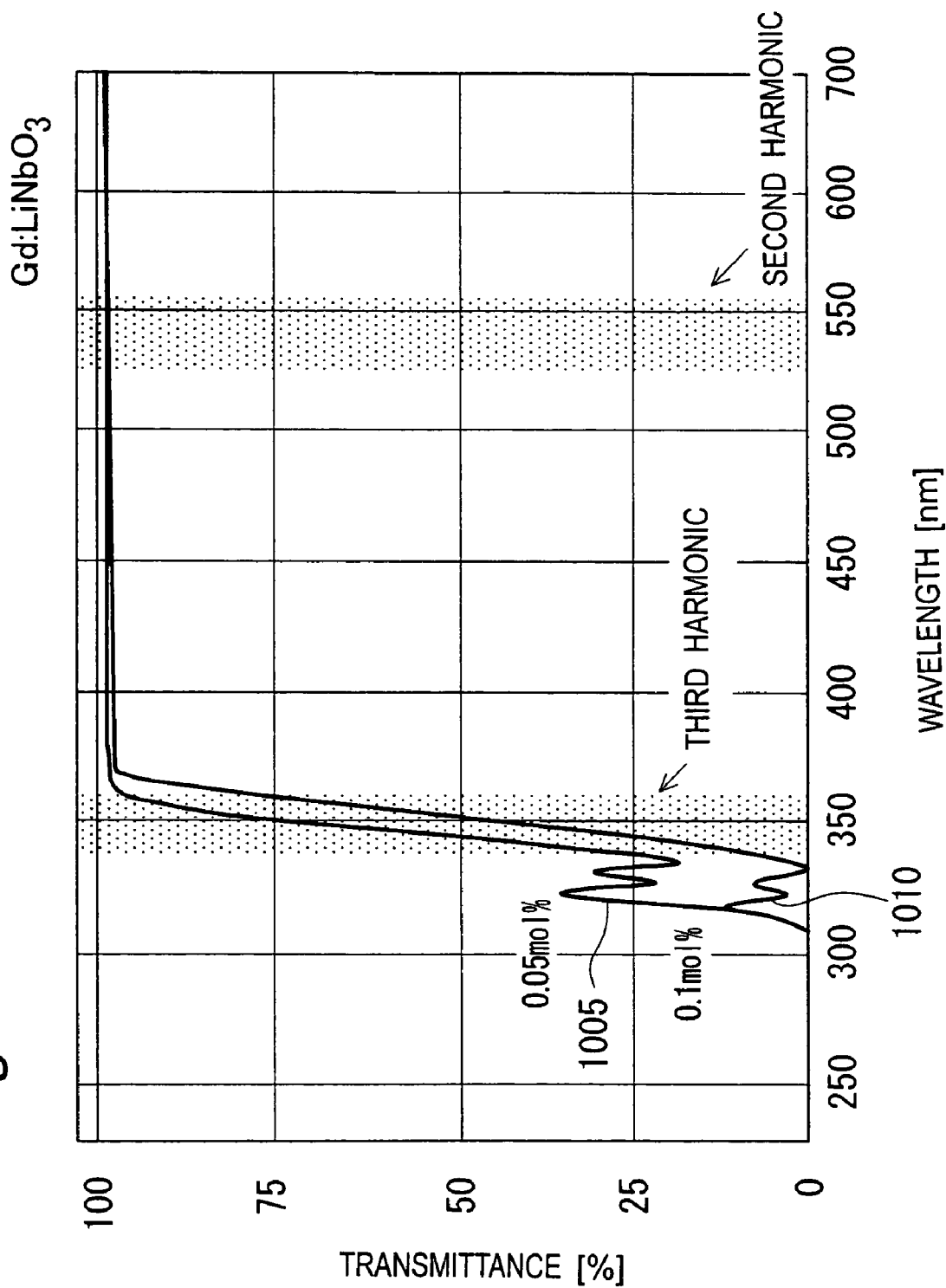
FIG. 10 is a spectral characteristic diagram of transmittance of a single crystal of $Gd:LiNbO_3$.

As in the first embodiment, A transmission spectrum of the Gd:LN wafer obtained was measured by a spectrophotometer. FIG. 10 is a diagram of spectral characteristics of transmittances of the Gd:LN wafer. The measurement target Gd:LN wafers were two Gd:LN wafers of 0.05 mol % and 0.1 mol % based on the molar ratio of the amount of doping of gadolinium oxide. Hereafter, Gd:LN of the molar ratio x mol % of the amount of doping of gadolinium oxide is designated as x mol % Gd:LN. The figure plots a 0.05 mol % Gd:LN transmittance curve 1005 and 0.1 mol % Gd:LN transmittance curve 1010. Additionally, in the drawing, spectral bands of the second harmonic (lambda/2) (green light) and the third harmonic (lambda/3) (ultraviolet light) in the case where infrared light is set to be a fundamental wave (lambda) are shaded to aid the understanding.

When referring to the plot, the two transmittance curves 1005 and 1010 exhibit in common substantially flat and high transmittance characteristics near the wavelength 542 nm in the green light region and also exhibit relatively low transmittance characteristics in the vicinity of the wavelength 361 nm in the ultraviolet region as compared with that of wavelength of near 542 nm. In other words, two Gd:LN wafers for measurement targets transmit light of wavelengths near 542 nm well in common and absorb light of wavelengths near 361 nm well in common. Therefore, if the infrared light of the wavelength (lambda:lambda≈1084 nm) is set to be a fundamental wave, the two Gd:LN wafers transmit green light near the second harmonic (lambda/2: lambda/2≈542 nm) well in common, and absorb ultraviolet light near the third harmonic (lambda/3: lambda/3≈361 nm) well in common. Additionally, playing a round of compare and contrast of the Gd:LN wafer of the present embodiment to the case of the Pr:LN wafer of the first embodiment (see FIG. 5), the Gd:LN wafer has a large absorption in the third harmonic (wavelength % 361 nm) as in the Pr:LN wafer and, furthermore, exhibits extremely flat and high transmittance in substantially the entire regions of visible light and infrared light. This is specific advantages of the wavelength converting element according to the second embodiment which uses the Gd:LN wafer.

The approach using a nonlinear optical material of which absorption end is shifted towards a longer wavelength from what the pure crystal of which originally possessed might be recognized as a perfect opposite approach from those of the conventional crystal material designing. However, the present approach is most desirable to decrease the inadvertently generated high harmonic.

<Results of Green Light Absorptance Measurement>

The absorption of green light attributable to ultraviolet light present within a nonlinear optical material was measured for evaluation by means of the method as in the first embodiment (Mercury Lamp Irradiation Experiment (see FIG. 6)).

Figure 11:
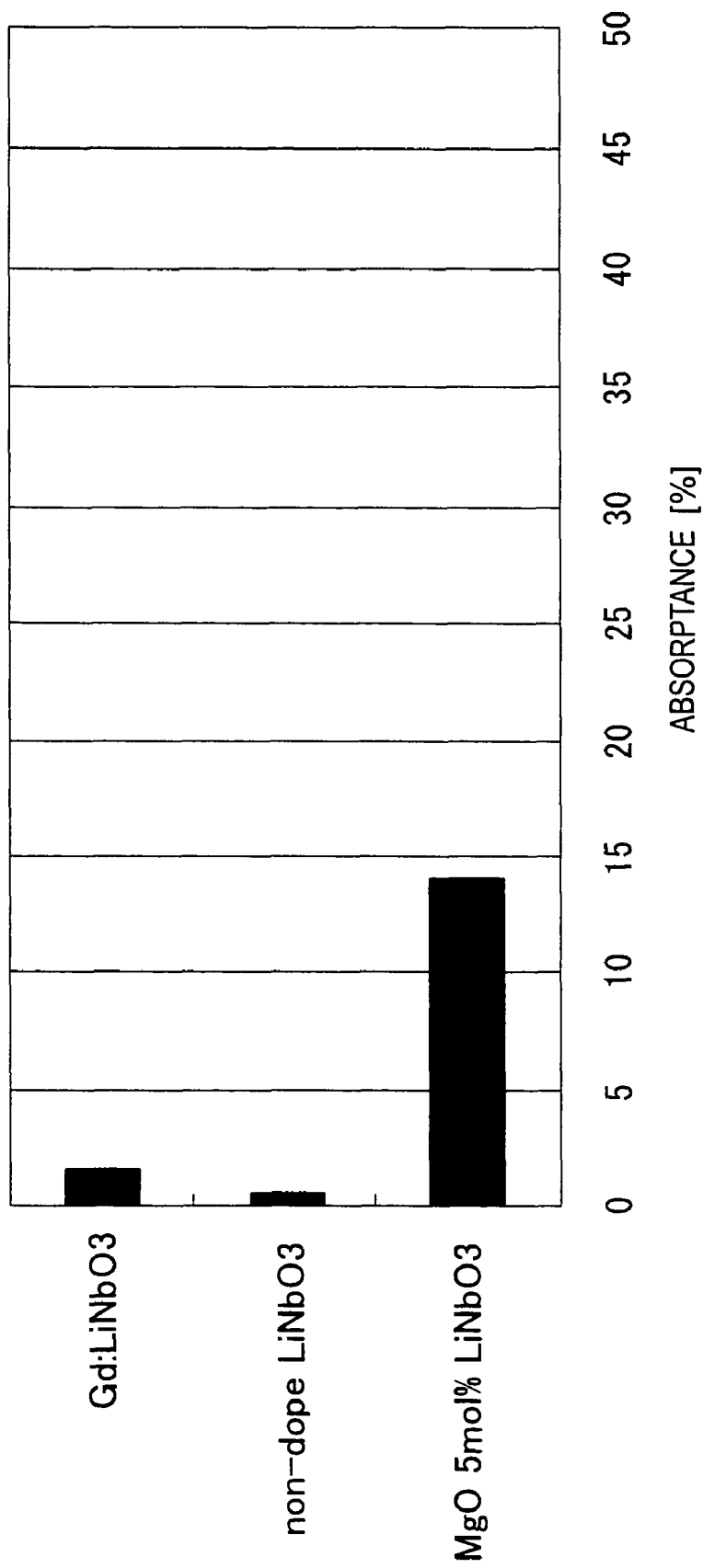
FIG. 11 is a diagram of light absorption evaluation results of $Gd:LiNbO_3$ by means of the apparatus for evaluating ultraviolet induction light absorption.

FIG. 11 is a diagram indicating the result of the mercury lamp irradiation tests (green light absorptance measurement). In the diagram, the abscissa axis denotes the percentage of the absorptances and the three crystal samples 403 are placed on the ordinate for indicating the measurement results. The three crystal samples 403 are Gd:LiNbO$_3$ grown in the embodiment, non-doped LiNbO$_3$ as a reference and MgO:LiNbO$_3$ having 5 mol % of MgO doped therein. In conventionally well used MgO:LiNbO$_3$ having MgO doped therein for the purpose of light damage suppression, the transmittance when ultraviolet light is irradiated is shown to lower by 15% as compared with the transmittance when ultraviolet light is not irradiated. On the other hand, the transmittances for the non-doped LiNbO$_3$ and Gd:LiNbO$_3$ grown in the embodiment do not lower. In other words, the doping of Gd is shown to well restrain green light absorption induced by ultraviolet light. Additionally, in the non-doped LiNbO$_3$, the refractive index change (deterioration) caused by light as mentioned above is liable to occur. It is to be noted that the non-doped LiNbO$_3$ is unsuitable for a wavelength converting element.

<Wavelength Converting Element Using Gd:LiNbO$_3$>

Next, a wavelength converting element using Gd:LiNbO$_3$ will be set forth.

<Formation of a Wavelength Converting Element>

The wafer obtained is subjected to photo-processing to form an electrode, and an electric field is applied thereto to carry out a polarization inversion treatment by means of the same method as described in the first embodiment. Also as in the case of the first embodiment, the inversion period is set to Lambda=7.36 micro-m. The Lambda of 7.36 micro-m is the period in which a second harmonic of the 1084 nm light is generated. And the length of the wavelength converting element is set to 25 mm.

<Characteristic Evaluation of the Wavelength Converting Element of Gd:LiNbO$_3$ Crystal>

A wavelength conversion characteristic evaluation is carried out on an element formed in above mentioned manner. Herein, the wavelength conversion characteristic evaluation is carried out by measuring the power of a second harmonic being output while changing the power of a fundamental wave being input. The optical system and the method used in those measurements are the same as those in the first embodiment (see FIG. 8).

Figure 12:
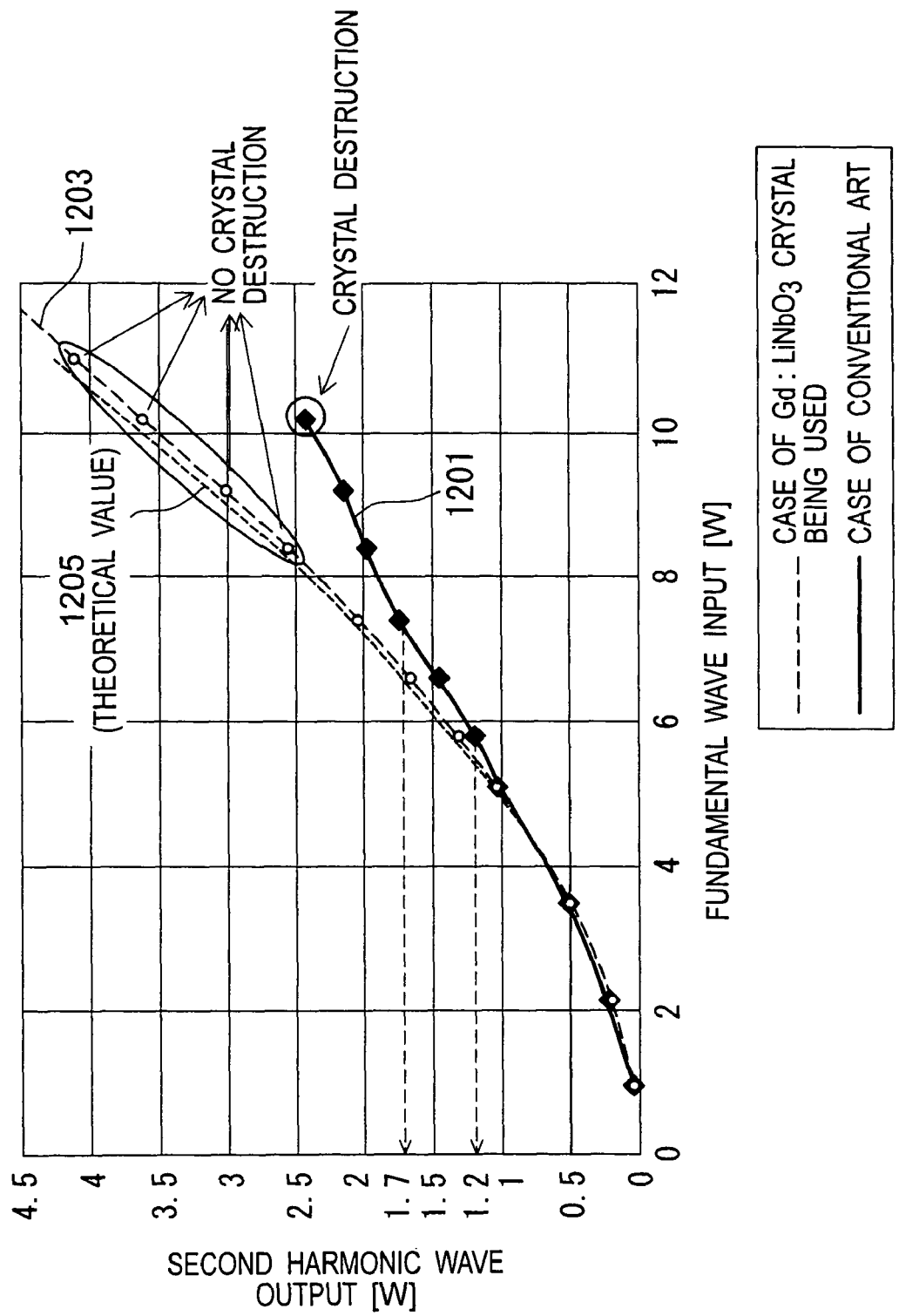
FIG. 12 is a diagram of wavelength conversion characteristic evaluation results of polarization inversion wavelength converting element having $Gd:LiNbO_3$.

FIG. 12 is a graph plotting the results of the present characteristic evaluation. In this plot, the abscissa axis denotes the power [W] of the fundamental wave being input to the polarization inversion element 603 (see FIG. 8), and the ordinate axis is the power [W] of the second harmonic wave (second harmonic (2omega)) measured by the power meter. In the present characteristic evaluation, two types of wavelength converting element are used. That is, the wavelength converting element of MgO:LiNbO$_3$ conventionally having 5 mol % of MgO doped therein and the wavelength converting element of Gd:LiNbO$_3$ being grown in the present embodiment and having the polarization inversion structure are used as the polarization inversion element 603.

A characteristic curve 1201 indicates the characteristic of the polarization inversion element (wavelength converting element) of the conventional crystal material MgO:LiNbO$_3$ with the polarization inversion structure formed therein. The characteristic curve 1201 is the same characteristic curve as the curve 901 of FIG. 9. The curve 1201 clearly bends at the vicinity where the second harmonic output exceeds 1.2 W, and the slope of the curve 1201 in the range until the output 1.7 W therefrom gets smaller as compared with the slope in a lower output range (1.2 W or less). This is attributable to the occurrence of the second harmonic (green light) absorption due to the third harmonic (ultraviolet light), which is generated by the interaction of the fundamental wave and the second harmonic. Further, the curve 1201 clearly bends again at the vicinity where the second harmonic output exceeds 1.7 W, and in the region of 1.7 W output or more (the region where the input exceeds about 8 W), the slope of the curve 1201 gets smaller as compared with the region of from 1.2 W to 1.7 W outputs. This indicates the occurrence of the second harmonic output saturation. Finally, when the output of the second harmonic (green light) reached about 2.5 W, internal damage within a crystal (crystal destruction) was occurred, hence the output of 2.5 W or more could not be obtained.

On the other hand, looking at a characteristic curve 1203, which indicates the characteristic of the polarization inversion element (wavelength converting element) of the Gd:LiNbO$_3$ of the present embodiment with the polarization inversion structure formed therein, it shows a slight but enlarging decrease in conversion efficiency in comparison with a characteristic curve 1205 of the theoretical value, as the second harmonic output rises. However, the occurrence of the second harmonic (green light) absorption due to the third harmonic (ultraviolet light) (e.g., the vicinity of the 1.2 W output of the curve 1201) and the occurrence of output saturation of the second harmonic (e.g., the vicinity of the 1.7 W output of the curve 1201) were well suppressed, so that no crystal destruction was observed even when the second harmonic output exceeds 2.5 W, and a second harmonic output exceeding 4 W could be obtained. This is due to the effect of ultraviolet absorption caused by the doped gadolinium (Gd). It is to be noted that the theoretical curve 1205 is a parabolic curve of the second order polynomial obtained from an order evaluation of the theoretical equation.

Differently than the case of the first embodiment, when Gd ion is doped like the present embodiment, most of the energy of the absorbed third harmonic is discharged as heat. As a result, the crystal generates heat while the second harmonic is output. However, the output of the third harmonic is as extremely small as an order of micro-W. Therefore, if only the temperature is being controlled by the Peltier element, this phenomena practically exerts no bad effects on wavelength conversion characteristics. This is the effect of the doped gadolinium (Gd), which absorbs ultraviolet light.

In the case where a fundamental wave is input so as to output a second harmonic, the wavelength converting element of the present embodiment having a polarization inversion element in which a polarization inversion structure is formed in the $Gd:LiNbO_3$ crystal is advantageous when a second harmonic output of 1.2 W or more is obtained, and more advantageous when a second harmonic output of 1.7 W or more is obtained. Herein, the fundamental wave may be infrared light of a wavelength from 800 to 1120 nm. In this case, the second harmonic can be from blue light to green light, having a wavelength from 400 to 560 nm. Still moreover, the fundamental wave may also be infrared light having a wavelength from 960 to 1110 nm. In this case, the second harmonic can be green light of a wavelength from 480 to 555 nm. The nonlinear optical material constituting the wavelength converting element of the present embodiment has an absorption end which is shifted about 10 nm towards longer wavelength side from the absorption end of this nonlinear optical material in which no gadolinium is doped. Because of this, it is clearly known from the spectral characteristics of the transmittance that the wavelength converting element of the present embodiment is suitable for a wavelength converting element used at applications where blue to green light (wavelength of from 400 to 560 nm) is generated as a second harmonic. It is described in the present embodiment the case where green light is generated as a second harmonic using infrared light as a fundamental wave. Actually, the constitution of the present embodiment makes it possible to generate blue to green light (wavelength of from 400 to 560 nm) as a second harmonic at a high output.

In addition, the nonlinear optical material used for the wavelength converting element according to the present embodiment can include, as an additive in the crystal, scandium (Sc), lanthanum (La), yttrium (Y), ytterbium (Yb), holmium (Ho) and lutetium (Lu) as well as gadolinium (Gd).

Preferably, the nonlinear optical material used for the wavelength converting element according to the present embodiment includes, as an additive in the crystal, at least any one of gadolinium (Gd), scandium (Sc), lanthanum (La), yttrium (Y), ytterbium (Yb), holmium (Ho) and lutetium (Lu).

More preferably, the nonlinear optical material used for the wavelength converting element according to the present embodiment includes, as an additive in the crystal, at least any one of gadolinium (Gd), scandium (Sc), lanthanum (La), yttrium (Y), ytterbium (Yb) and holmium (Ho). This is because that the amount of the shift of the absorption end in the case where any one or more of Gd, Sc, La, Y, Yb and Ho is doped is larger than the amount of the shift of the absorption end in the case where Lu is doped. In the former case, it is possible to absorb the light in the ultraviolet region better than that in the latter case.

Further more preferably, the nonlinear optical material used for the wavelength converting element according to the present embodiment includes, as an additive in the crystal, at least any one or more of gadolinium (Gd), scandium (Sc), lanthanum (La), yttrium (Y) and ytterbium (Yb). This is because that, however Ho has an extremely small absorption in a band of a wavelength from 1060 to 1080 nm, Gd, Sc, La, Y and Yb has no such absorption in the band. In addition to the above reason, the amount of the shift of the absorption end in the case where any one or more of Gd, Sc, La, Y and Yb is larger than the amount of the shift of the absorption end in the case where Ho is doped. In the former case, it is possible to absorb the light in the ultraviolet region better than that in the latter case.

Further yet more preferably, a nonlinear optical material used for a wavelength converting element according to the present embodiment includes, as an additive in a crystal, at least any one or more of gadolinium (Gd), scandium (Sc) and lanthanum (La). This is because that the amount of the shift of the absorption end in the case where any one or more of Gd, Sc and La are doped is larger than the amount of the shift of the absorption end in the case where any one or more of Y and Yb are doped. In the former case it is possible to absorb the light in the ultraviolet region further better than that in the latter case.

Further yet more preferably, a nonlinear optical material used for a wavelength converting element according to the present embodiment includes, as an additive in a crystal, at least any one or more of gadolinium (Gd) and scandium (Sc). This is because that the amount of the shift of the absorption end in the case where any one or more of Gd and Sc are doped is larger than the amount of the shift of the absorption end in the case where La is doped. In the former case it is possible to absorb the light in the ultraviolet region further better than that in the latter case.

Further yet more preferably, a nonlinear optical material used for a wavelength converting element according to the present embodiment includes, as an additive in a crystal, gadolinium (Gd). This is because that the amount of the shift of the absorption end in the case where Gd is doped is larger than the amount of the shift of the absorption end in the case where Sc is doped. In the former case it is possible to absorb the light in the ultraviolet region further better than that in the latter case. In addition to above reason, Gd has an absorption peak in the ultraviolet region (see FIG. 10).

Among the amounts of the shift of the absorption end by doping above seven kinds of rare earth elements, the case where Gd is doped is the largest. The case where Sc is doped is secondly largest. Then the case where any one of Y and Yb is doped is the third. Y and Yb shows substantially same amount of the shift. Following the above, the cases where La, Ho or Lu is doped are larger in the order. The above seven rare earth elements are all suitable for a wavelength converting element of the present the embodiment. The larger the amount of the shift of the absorption end is, the more advantageous the light absorption capability of the light of the ultraviolet region is. Even Gd indicating the largest amount of the shift of the absorption end has a flat transmission property to the light in the visible light region. Therefore, the wavelength converting element according to the present embodiment can be used for the conversion of visible light of any colors.

For gadolinium (Gd), lanthanum (La), ytterbium (Yb), holmium (Ho) and lutetium (Lu) of the above mentioned seven additives from rare earth elements, the upper limits of the molar ratio of the amount of doping of their oxides is preferably about 0.5 mol % in common, as in the case of the example of gadolinium oxide mentioned above. When the molar ratio does not exceed 0.5 mol %, an arbitrary amount of doping can be selected and easily grow the crystal. The molar ratio of the amount of doping is more preferably from 0.05 to 0.5 mol %, further more preferably from 0.05 to 0.1 mol %.

For scandium (Sc) and yttrium (Y) of the above mentioned seven additives, differently than the example of gadolinium oxide described above, doping of 0.5 mol % or more by the molar ratio of the oxide is possible. This is because that the ion radii of Sc and Y are small, and the high doping is possible compared with that of the above other five kinds of rare earth elements. The molar ratio of the amount of doping is preferably from 1.3 to 4.0 mol %, more preferably from 1.5 to 2.0 mol %.

<Wavelength Converter Using the Wavelength Converting Element of the Present Invention>

In any one of wavelength converting elements according to the first and second embodiments, an optical system used for the characteristic evaluation of wavelength conversion shown in FIG. 8 can be utilized as a wavelength converter without modification. In addition, the Peltier element 605 may be omitted since the heat release value of the wavelength converting element can be suppressed more than that of a conventional. Still moreover, the condenser lens 602 and a re-collimation lens 604 may be optional. Comparing the optical system of FIG. 8 with the constitution of a conventional example of a wavelength converter indicated in FIG. 2, it is obvious that both the constitution and members of the system of FIG. 8 are simplified. The wavelength converter using the wavelength converting element according to the embodiments is advantageous in that the converter has a configuration simpler than that of conventional one. Hence, it makes the cost of a wavelength converter be low as well.

<High Output Laser Display Using the Wavelength Converting Element of the Present Invention>

Figure 13:
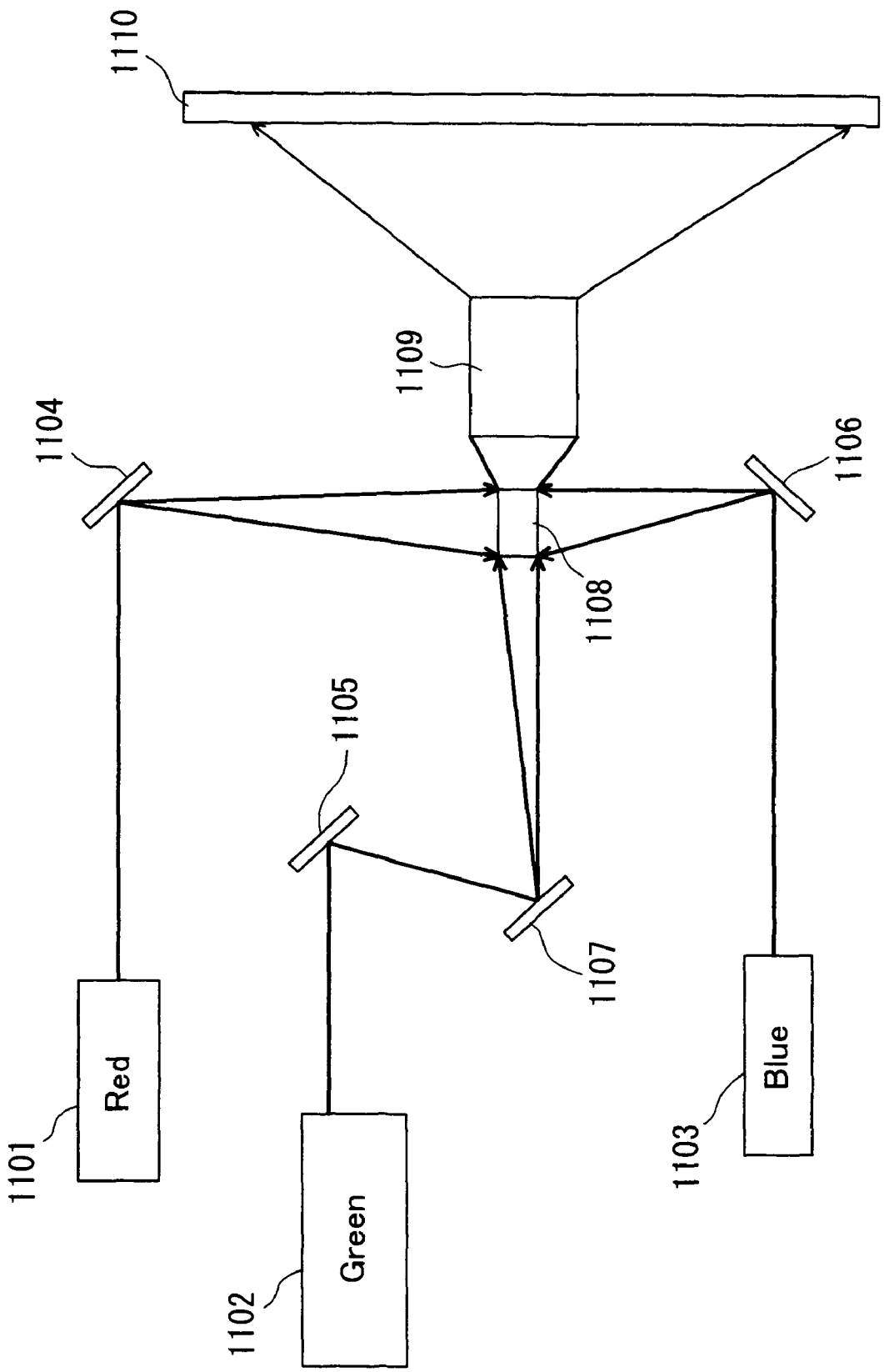
FIG. 13 is a schematic diagram of an example of a laser display (image display apparatus) using a wavelength converting element according to the present invention.

Additionally, the use of the wavelength converting elements illustrated in the first and second embodiments enables the generation of the green light of a power of 2.5 W or more and blue light of a power of 2.0 W or more, which are conventional limits. When a display (projector) having a luminance of 1000 μm is constituted, although a necessary light quantity of each color slightly varies depending on the constitution, the necessary light quantities for a red color, a green color and a blue color are 3.0 W, 2.8 W and 3.0 W, respectively. Using the wavelength converting element according to the present invention, such a high luminance laser display (image display apparatus) having a luminance of 1000 lm or more can be achieved. FIG. 13 illustrates an example of the configuration of such laser display (image display apparatus) using the wavelength converting element according to the present invention.

Three laser light sources of red, green and blue are used. A red laser light source 1101 includes a GaAs semiconductor laser having a wavelength of 635 nm. The semiconductor laser is structured such that outputs of 3 to 8 semiconductor laser diodes are output from an output of one fiber by means of bundle fibers, and its spectral width is as broad as several nanometers. This broad spectrum suppresses the occurrence of speckle noise.

A blue light source 1103 and a green light source 1105 respectively include a wavelength conversion blue light source and a wavelength conversion green light source both of which contain the elements that the present invention have suggested.

Beams from the red light source 1101, green light source 1102 and blue light source 1103 are sent to reflective modulator elements 1104, 1105 and 1106, respectively and spatially modulated. Via a mirror 1107, the green light is mixed with red and blue light at a multiplexing prism 1108 to form a color image. The formed color image is projected onto a screen 1110 by means of a projection lens 1109.

Moreover, it is possible to make up a projector which projects an image from the backside of a screen, in addition to the above image display apparatus.

Additionally, in FIG. 13, a reflective spatial modulator element to which a subminiature mirror is integrated is used, it is also possible to use a modulator element using a liquid crystal or a galvanomirror.

SUMMARY

In the first embodiment, the wavelength converting element using the nonlinear optical material produced by doping of Pr ions to a lithium niobate single crystal is described. The nonlinear optical material produced by doping of Pr ions to a lithium niobate single crystal exhibits a high transmittance in the green light region, and has a broad absorption peak in the ultraviolet region.

In the second embodiment, the wavelength converting element using the nonlinear optical material produced by doping of Gd ions to a lithium niobate single crystal is described. The nonlinear optical material produced by doping of Gd ions to a lithium niobate single crystal is substantially transparent from the visible light region to the infrared light region and exhibits a sharp absorption peak in the ultraviolet region (near 350 nm).

In addition to the above dopants Pr and Gd, the wavelength converting element using the nonlinear optical material produced by doping of a rare earth element such as Sc, Y, La, Ce, Eu, Ho, Yb or Lu also has an effect similar to the effects described in the first and second embodiments.

Of the above seven kinds of rare earth elements, the wavelength converting element using the nonlinear optical material having Pr doped therein as described in the first embodiment or having a rare earth element such as Ce or Eu doped therein exhibits a high transmittance in the green light region and shows a broad absorption peak in the ultraviolet region. Because of this, an unnecessary higher harmonic in the ultraviolet region is removed, and it is further possible to output a lower harmonic in the green light region at a high power.

The wavelength converting element using the nonlinear optical material produced by doping of rare earth element such as Pr, Ce or Eu can be made to have properties of emitting light of a long wavelength (visible light) by absorbing the ultraviolet light. Therefore, it is possible to suppress heat release due to the light absorption and a phase matching state is readily kept stable.

In addition, of the above seven kinds of rare earth elements, the wavelength converting element using the nonlinear optical material having Gd doped therein as described in the second embodiment or having a rare earth element such as Sc, Y, La, Ho, Yb or Lu doped therein is substantially transparent from the visible region to the infrared light region, and, due to the doping, its absorption end of the crystal has been shifted to the ultraviolet region (near 350 nm). Hence, the wavelength converting element removes an unnecessary higher harmonic in the ultraviolet region, and can output a lower harmonic in the visible light region at a high power without having the lower harmonic re-absorbed into the wavelength converting element.

The above first and second embodiments describe the case where a rare earth element is doped into a crystal of lithium niobate. Moreover, a similar effect is obtained also in the case where the above rare earth element is doped into a lithium tantalate crystal, a magnesium oxide (MgO) doped lithium niobate crystal, a magnesium oxide (MgO) doped lithium tantalate crystal, a zinc oxide (ZnO) doped lithium niobate crystal, or a zinc oxide (ZnO) doped lithium tantalate crystal, which has a crystal structures and properties similar to the lithium niobate crystal.

Although Nd or Yb doped lithium niobate crystals and the like have been studied as a self-frequency multiplyer element (a self-doubling element), the purpose of the above is to reduce the number of parts. Excited Nd or Yb ion by another laser generates infrared light and a polarization inversion crystal generates a second harmonic. The object of the above is quite different from that of the present invention.

The nonlinear optical element (wavelength converting element) having the nonlinear optical material according to the present invention includes, as an additive, at least one kind of rare earth elements. As seen from its absorption peak, the additive (rare earth ion) absorbs an unnecessary ultraviolet light present within the element, and converts the ultraviolet light into the heat and/or light having a wavelength longer than that of ultraviolet light by the process of excitation/relaxation of an electron of the ion. This action suppresses the absorption of a second harmonic (green light) caused by the presence of the ultraviolet light (e.g., a third harmonic), thereby being capable of avoiding saturation of the output and crystal destruction.

Additionally, to conventionally obtain large output, a fundamental wave is distributed and the outputs are generated by a plurality of wavelength converting elements. However, the wavelength converter using the nonlinear optical element of the present invention is simplified in its structure and complicated adjustments are unnecessary, thereby being capable of reducing the cost needed for manufacturing.

In addition, wavelength converting elements illustrated in each embodiment above are only examples, and other aspects can be made within the scope and the spirit of the present invention.

The wavelength converting element according to the present invention provides a wavelength converter of a simpler configuration than those of conventional ones. Thus, the reliability of the apparatus is improved and also complicated adjustments can be abolished, so the wavelength converter, the high luminance laser display (image display apparatus) and the like can be provided at a lower production cost than the conventional costs.

What is claimed is:

1. A wavelength converting element that receives a fundamental wave of light of a wavelength lambda to output a second harmonic of light of a wavelength lambda/2, comprising:
   a crystal including at least one element selected from the group consisting of Y, La, Ce, Gd, Sc, Ho and Lu as an additive to absorb a third harmonic of light of a wavelength lambda/3 by sum frequency generation of the fundamental wave and the second harmonic,
   wherein said crystal consists essentially of any one of lithium niobate $LiNbO_3$ and lithium tantalate $LiTaO_3$,
   wherein said additive is configured to prevent the second harmonic of light from interacting with the third harmonic of light by absorbing the third harmonic of light whereby an output saturation of the second harmonic of light is suppressed, and
   wherein the second harmonic of light has a power density of 50 kW/cm$^2$ or more.

2. The wavelength converting element according to claim 1, wherein said additive is Ce.

3. The wavelength converting element according to claim 1, wherein said additive is Y, La, Gd, or Lu.

4. The wavelength converting element according to claim 3, wherein said additive is Y.

5. The wavelength converting element according to claim 3, wherein said additive is La.

6. The wavelength converting element according to claim 3, wherein said additive is Gd.

7. The wavelength converting element according to claim 3, wherein said additive is Lu.

8. The wavelength converting element according to claim 1, wherein said additive is doped to said crystal as a trivalent oxide.

9. The wavelength converting element according to claim 1, wherein said crystal includes any one of magnesium oxide and zinc oxide as a further additive.

10. The wavelength converting element according to claim 1, wherein a wavelength of the second harmonic is from 400 to 560 nm.

11. The wavelength converting element according to claim 1, wherein a wavelength of the second harmonic is from 480 to 560 nm.

12. The wavelength converting element according to claim 1, wherein a wavelength of the second harmonic is from 480 to 555 nm.

13. The wavelength converting element according to claim 1, wherein said crystal which consists essentially of any one of lithium niobate $LiNbO_3$ and lithium tantalate $LiTaO_3$ is a single crystal.

14. The wavelength converting element according to claim 1, wherein said crystal includes Ho as said additive.

* * * * *